US011473741B2

(12) United States Patent
Chien

(10) Patent No.: US 11,473,741 B2
(45) Date of Patent: Oct. 18, 2022

(54) LED LIGHT HAS BUILT-IN AIR RELATED PART(S)

(71) Applicant: Tseng-Lu Chien, Walnut, CA (US)

(72) Inventor: Tseng-Lu Chien, Walnut, CA (US)

(73) Assignees: Aaron Chien, Walnut, CA (US); Hsin-Yi Wang, Walnut, CA (US); Te-Ju Chien, Walnut, CA (US)

( * ) Notice: Subject to any disclaimer, the term of this patent is extended or adjusted under 35 U.S.C. 154(b) by 80 days.

(21) Appl. No.: 16/568,735

(22) Filed: Sep. 12, 2019

(65) Prior Publication Data

US 2020/0003375 A1 Jan. 2, 2020

Related U.S. Application Data

(60) Continuation-in-part of application No. 14/829,213, filed on Aug. 18, 2015, now abandoned, which is a (Continued)

(51) Int. Cl.
*F21S 8/00* (2006.01)
*F21S 9/02* (2006.01)
(Continued)

(52) U.S. Cl.
CPC ............ *F21S 8/035* (2013.01); *F21S 9/02* (2013.01); *F21S 10/007* (2013.01); *F21V 5/04* (2013.01);
(Continued)

(58) Field of Classification Search
CPC .. F21S 8/035; F21S 9/02; F21S 10/007; F21S 8/026; F21V 21/14; F21V 21/22;
(Continued)

(56) References Cited

U.S. PATENT DOCUMENTS 4,443,832 A 4/1984 Kanamori et al.
4,514,789 A 4/1985 Jester
(Continued)

FOREIGN PATENT DOCUMENTS

WO WO2008073905 A2 6/2008
WO WO-2015113003 A1 * 7/2015 ............... A61N 5/01

OTHER PUBLICATIONS

Cheng et al., (Cheng) "Development of wireless RGB LED dimming control technology using smartphone", 2014, International Conference on Intelligent Green Building and Smart Grid (IGBSG), IEEE, pp. 1-4 (Year: 2014).*

*Primary Examiner* — M Baye Diao
(74) *Attorney, Agent, or Firm* — Bacon & Thomas, PLLC

(57) ABSTRACT

A LED light with built-in Air flow device has AC-to-DC circuit to get DC current to supply power to LED or LEDs and-to charge inside rechargeable batteries and to the inside air flow related device or other product(s). The LED light connect IC and control circuit to make setting, changing, adjust of the said at least one of (A) LED(s) colors, brightness, on-off, duration, cycles, frequency, sequential, flashing, color changing, color selection, auto changing, or other LED light effects, (B) Air flow related parts to get desired speed of rotating fan or blade, on-off, duration, timer, countdown timer, or other desired air flow related function(s); by at least one of (1) trigger system, (2) switch, (3) sensor, (4) motion or moving or radar sensor, (5) IR or RF remote control system, (6) power fail sensor, (7) built-in Auto-Off-On or multiple selection positions switch, (8) other related LED or air flow or air-freshener or fragrance or essential oil diffusor parts or accessories; wherein the LED light connect with (i) AC power source by prongs with or without folding features, (ii) DC power from at least one outside transformer, power bank, DC power from cigarette-
(Continued)

plug, USB related DC power source, DC power storage device, solar module, or DC generator.

19 Claims, 9 Drawing Sheets

Related U.S. Application Data division of application No. 13/295,562, filed on Nov. 14, 2011, now Pat. No. 10,066,798, which is a continuation-in-part of application No. 12/622,000, filed on Nov. 19, 2009, now Pat. No. 8,434,927, said application No. 14/829,213 is a continuation of application No. 13/534,281, filed on Jun. 27, 2012, now Pat. No. 8,960,988, which is a continuation of application No. 12/710,561, filed on Feb. 23, 2010, now Pat. No. 8,303,158, application No. 16/568,735, which is a continuation of application No. 14/793,262, filed on Jul. 7, 2015, now abandoned, and a continuation-in-part of application No. 14/739,666, filed on Jun. 15, 2015, now Pat. No. 10,487,999, which is a continuation-in-part of application No. 11/806,285, filed on May 31, 2007, now Pat. No. 11,082,664, application No. 16/568,735, which is a continuation-in-part of application No. 14/739,499, filed on Jun. 15, 2015, now Pat. No. 10,508,784, which is a continuation-in-part of application No. 11/806,285, filed on May 31, 2007, now Pat. No. 11,082,664, application No. 16/568,735, which is a continuation-in-part of application No. 14/739,397, filed on Jun. 15, 2015, now Pat. No. 10,184,624, which is a continuation-in-part of application No. 11/806,285, filed on May 31, 2007, now Pat. No. 11,082,664, application No. 16/568,735, which is a continuation-in-part of application No. 14/829,213, filed on Aug. 18, 2015, now abandoned.

(51) Int. Cl.

| | | |
|---|---|---|
| F21V 21/14 | (2006.01) | |
| F21V 21/22 | (2006.01) | |
| F21V 17/02 | (2006.01) | |
| G03B 23/00 | (2006.01) | |
| F21V 14/00 | (2018.01) | |
| F21S 10/00 | (2006.01) | |
| F21V 14/08 | (2006.01) | |
| F21V 5/04 | (2006.01) | |
| F21V 13/02 | (2006.01) | |
| F21V 14/06 | (2006.01) | |
| F21V 23/00 | (2015.01) | |
| F21V 33/00 | (2006.01) | |
| G02F 1/13 | (2006.01) | |
| G03B 21/20 | (2006.01) | |
| F21V 29/00 | (2015.01) | |
| F21Y 115/10 | (2016.01) | |
| F21V 21/30 | (2006.01) | |
| F21V 23/04 | (2006.01) | |
| F21W 121/00 | (2006.01) | |
| F21Y 101/00 | (2016.01) | |

(52) U.S. Cl.
CPC ............ *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/14* (2013.01); *F21V 21/22* (2013.01); *F21V 23/00* (2013.01); *F21V 29/00* (2013.01); *F21V 33/0052* (2013.01); *G02F 1/1313* (2013.01); *G03B 21/2046* (2013.01); *G03B 23/00* (2013.01); *F21V 21/30* (2013.01); *F21V 23/0471* (2013.01); *F21W 2121/00* (2013.01); *F21Y 2101/00* (2013.01); *F21Y 2115/10* (2016.08); *Y10S 362/80* (2013.01); *Y10S 362/806* (2013.01)

(58) Field of Classification Search
CPC ........ F21V 17/02; F21V 14/006; F21V 14/08; F21V 5/04; F21V 13/02; F21V 14/003; F21V 14/06; F21V 23/00; F21V 33/0052; F21V 21/30; F21V 23/0471; F21V 33/0096; G03B 23/00; G03B 21/2046; G03B 25/00; G02F 1/1313; Y10S 362/80; Y10S 362/806; F21Y 2115/10; F21Y 2101/00; F21Y 2105/12; F21W 2121/00
USPC ........................................................ 362/257
See application file for complete search history.

(56) References Cited

U.S. PATENT DOCUMENTS

| | | | |
|---|---|---|---|
| 4,794,315 A | 12/1988 | Pederson | |
| 5,164,020 A | 11/1992 | Wagner et al. | |
| 5,410,453 A | 4/1995 | Ruskouski | |
| 5,548,494 A | 8/1996 | Blackman | |
| 5,575,861 A | 11/1996 | Younan et al. | |
| 5,610,450 A | 3/1997 | Saeki | |
| 5,644,291 A | 7/1997 | Jozwik | |
| 5,763,872 A | 6/1998 | Ness | |
| 5,806,961 A | 9/1998 | Dalton et al. | |
| 5,847,545 A | 12/1998 | Chen et al. | |
| 5,879,069 A * | 3/1999 | Chien .................... | G02B 6/001 362/103 |
| 6,558,022 B2 * | 5/2003 | Kawahara ................ | G02B 3/00 362/257 |
| 7,083,376 B2 | 8/2006 | Crofton et al. | |
| 7,262,559 B2 * | 8/2007 | Tripathi ................ | H05B 45/385 315/291 |
| 7,387,537 B1 | 6/2008 | Daily et al. | |
| 7,604,370 B2 | 10/2009 | Dowdy et al. | |
| 8,203,283 B2 * | 6/2012 | Hoogzaad .............. | H05B 45/48 362/613 |
| 8,303,158 B2 | 11/2012 | Chien | |
| 8,960,988 B2 | 2/2015 | Chien | |
| 9,265,105 B2 * | 2/2016 | McCune, Jr. ........ | H05B 45/375 |
| 2004/0000334 A1 | 1/2004 | Ressler | |
| 2005/0077869 A1 | 4/2005 | Yueh | |
| 2005/0133800 A1 | 6/2005 | Park et al. | |
| 2005/0178430 A1 | 8/2005 | McCaskill et al. | |
| 2005/0231941 A1 | 10/2005 | Huang | |
| 2006/0082991 A1 | 4/2006 | Hrabal | |
| 2007/0076440 A1 * | 4/2007 | Chien .................... | H02J 7/0047 362/643 |
| 2007/0182368 A1 | 8/2007 | Yang | |
| 2008/0149170 A1 | 6/2008 | Hanoka | |
| 2008/0271773 A1 | 11/2008 | Jacobs et al. | |
| 2008/0302030 A1 | 12/2008 | Stancel et al. | |
| 2008/0302409 A1 | 12/2008 | Bressler et al. | |
| 2009/0000222 A1 | 1/2009 | Kalkanoglu et al. | |
| 2009/0189548 A1 | 7/2009 | Hoffman et al. | |
| 2009/0320389 A1 | 12/2009 | White | |
| 2010/0105245 A1 | 4/2010 | Good et al. | |
| 2010/0180523 A1 | 7/2010 | Lena et al. | |
| 2010/0213849 A1 | 8/2010 | Chien | |
| 2010/0271814 A1 | 10/2010 | Messinger et al. | |
| 2012/0155069 A1 | 6/2012 | Chen | |
| 2012/0188780 A1 * | 7/2012 | Wilk ..................... | F21V 29/763 362/183 |
| 2013/0176738 A1 | 7/2013 | Tinaphong et al. | |
| 2014/0340880 A1 * | 11/2014 | Benner ................. | F21V 33/006 362/147 |
| 2015/0192284 A1 * | 7/2015 | Steinberg ............... | F21V 29/71 362/231 |
| 2019/0342963 A1 * | 11/2019 | Diana .................... | H05K 1/147 |

\* cited by examiner

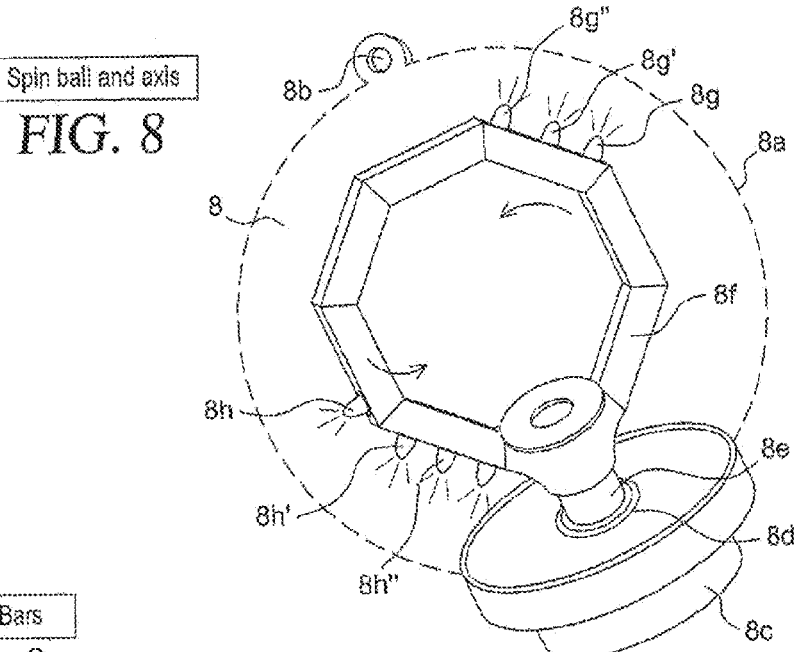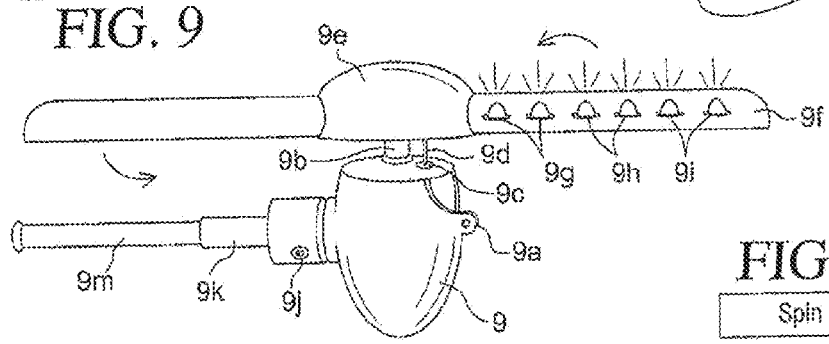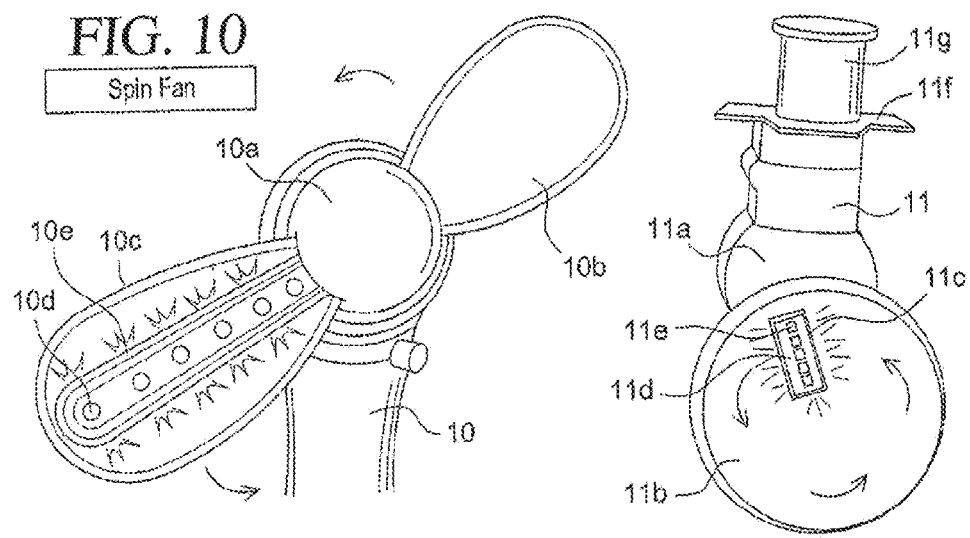

11,473,741 B2

LED LIGHT HAS BUILT-IN AIR RELATED PART(S)

CROSS-REFERENCE TO RELATED APPLICATIONS

This is Division of
(#HH-3) application No. Ser. No. 14/828,213, filed on Aug. 18, 2015,
which is Continuation-in-part of
(#HH-2) application No. Ser. No. 14/829,114, filed on Aug. 18, 2015,
which is Continuation-in-part of
(#HH-1) application No. Ser. No. 13/295,562, filed on Nov. 14, 2011,
which is division of
(#HH-09) application No. Ser. No. 12/622,000, filed on Nov. 19, 2009, now U.S. Pat. No. 8,434,927,
which is Continuation-in-Part of
(#JJ-2) application Ser. No. 14/604,204, filed on Jan. 23, 2015, now is U.S. Pat. No. 9,163,799 which is a continuation of
(#JJ-1) application No. Ser. No. 13/534,281, filed on Jun. 27, 2012, now U.S. Pat. No. 8,960,988, which is a continuation of
(#JJ-2010) application No. Ser. No. 12/710,561, filed on Feb. 23, 2010, now U.S. Pat. No. 8,303,158.
This is Division of Application
(#R-3) application No. Ser. No. 14/739,666,
which is continuously of
(#R-2) Ser. No. 14/739,499, which is continuously of
(#R-1) Ser. No. 14/739,397
all (3) application are filed on Jun. 15, 2015,
which is Continuation-in-part of
(#R-07) application Ser. No. 11/806,285 filed May 31, 2007.

This application is a continuation-in-part of U.S. patent application Ser. No. 14/829,213, filed Aug. 18, 2015, which is a division of U.S. patent application Ser. No. 13/295,562, filed Nov. 14, 2011, which is a continuation-in-part of U.S. patent application Ser. No. 12/622,000, filed Nov. 19, 2009, now U.S. Pat. No. 8,434,927, each of which is incorporated herein by reference.

U.S. patent application Ser. No. 14/829,213, is also a continuation-in-part of U.S. patent application Ser. No. 14/604,204, filed Jan. 30, 2015, now U.S. Pat. No. 9,163,799, which is a continuation of U.S. patent application Ser. No. 13/534,281, filed Jun. 27, 2012, now U.S. Pat. No. 8,960,988, which is a continuation of U.S. patent application Ser. No. 12/710,561, filed Feb. 23, 2010, now U.S. Pat. No. 8,303,158, each of which is incorporated herein by reference.

This application is also a continuation-in-part of U.S. patent application Ser. No. 14/739,666, filed Jun. 15, 2015, Ser. No. 14/739,499, filed Jun. 15, 2015, and Ser. No. 14/739,397, filed Jun. 15, 2015, each of which is a continuation-in-part of U.S. patent application Ser. No. 11/806,285, filed May 31, 2007.

BACKGROUND OF THE INVENTION

This application has subject matter in common with U.S. patent application Ser. Nos. 12/624,621, 12/622,100, 12/318,471, 12/318,470, 12/318,473, 12/292,153, 12/232, 505, 12/232,035, 12/149,963, 12/149,964, 12/073,095, 12/073,889, 12/007,076, 12/003,691, 12/003,809, 11/806, 711, 11/806,285, 11/806,284, 11/566,322, 11/527,628, 11/527,629, 11/498,874, 12/545,992, 12/806,711, 12/806, 285, 12/806,284, 12/566,322, 12/527,628, 12/527,629, 12/527,631, 12/502,661, 11/498,881, 11/255,981, 11/184, 771, 11/152,063, 11/094,215, 11/092,742, 11/092,741, 11/094,156, 11/094,155, 10/954,189, 10/902,123, 10/883, 719, 10/883,747, 10/341,519, 12/545,992, and 12/292,580. The above-listed applications include disclosures related to light devices such as night lights powered by an AC outlet, battery, solar cell, or other power source, the light devices using optics theory to create a plurality of LED light images on a surface and which may contain more than one light source, function, or optics means.

SUMMARY OF THE INVENTION

The current invention one preferred function as co-inventor parent filed case (#JJ-2) (#JJ-1) (#JJ-2010) applies the persistence of vision effect to a plug-in outlet or connect cigarette or USB receptacle LED light device to cause LED array light effects to be seen by viewers. Wherein the light effect or light patterns is at least or more than one a message display, time display, color or color changing display, word display, logo display, or advertisement display providing-exciting and eye-catching LED device. Wherein the LED light device beside the light function(s) and air related function(s) optional has other added function(s) and incorporate with at least one desired power source, IC, circuitry, switch, sensor, motion sensor, radar sensor, wi-fi system, download APP, timer, power fail detector, and/or other related parts and accessories to cause the light to have most practical function(s), multiple function can be powered by prong, cigarette plug, USB power bank, USB wires for at least nighttime use light, power fail light, flashlight, sensor light, remote control light, wireless control light beside the air related functions including at least on air flow, air fresher, fragrancy, essential oil or steam diffusor, Time display, moving image or patterns, and be convenient to people to use.

The light device with special effects of the current invention may include one or more of the following 14 features:
1. The LED light device with special effects may include a special effects mechanism made up of at least one LED array arranged on a flexible PCB or preferred substrate, and at least one spin means for rotating the flexible PCB or preferred substrate at a predetermined speed (RPM) about an axis extending from the spin device such as motor and gear-set(s), or clock movement or magnetic reaction sets. The predetermined speed is preferably quickly enough to provide a persistence of vision effect as described below. The LED or LEDs of the light device for at least one function(s) select from (A) nighttime use light (B) night light (C) power fail light (D) flashlight (E) cigarette plug light (F) body carry light with air related functions; those turn on and off according to a predetermined pattern, timing, color, function, and/or effects and controlled by an appropriate (1) circuit, (2) IC, (3) controller or control circuit(s), (4) wireless system, (5) IR or RF remote controller, (6) switch, (7) sensor, (8) timer, (9) auto turn on and turn off, (10) power source (DC, AC, or interchangeable power source), (11) gear sets, (12) motor, (13) integrated circuit (IC), and/or (14) conductive piece; to cause the light device to exhibit desired light patterns such as a message display, time display, color changing display, word display, logo display, and advertisement display. The LED light device has LED light effects and air related function(s) with at least or more than one optional additional functions or parts; the additional function preferred selected having persistence of vision properties includes a desktop or outlet plug-in type housing to install at least one of substrate, spin device, LED(s) or LED arrays, motor, switch, sensor, circuit, IC, and power source provided in the light device. The LED light device may further incorporate a vibration absorbing to absorb all vibrations of the motor or spin device(s) vibration when people put the device on a desk top or plug-in outlet or on the people neck of body for enjoy at least one (i) Air flow (ii) air fresher (iii) fragrance (iv) moisture, steam, liquid, coolant sprayer (v) essential oil diffusor (v) variable air flow (vi) at least one multiple functions or light effects.

2. The LED light device with special effects may include at least one LED and an-air flow related kits with preferred construction of fan cover or grill with or without rotating construction to spread air to preferred direction(s) to be added onto the fan or fan blade and to prevent kids or people finger touching the fan or fan blade(s) for obtaining a final LED light device with special effects. The added-on fan cover or grill with or without rotating may be made of plastic, paper, wood. The final LED light device may use any power source, such as a battery, outlet, or power source that is interchangeable between DC and AC power sources; for at least one application for desktop, plug-in outlet, connect with cigarette-socket(s), people carry on neck.

3. The light device has LED light effects and air related function(s) with special effects may be arranged to meet the requirements of persistence of vision theory to create an illusion based on the inertia of a human eye, which takes $\frac{1}{16}$ to $\frac{1}{24}$ second to respond to an image. When the LED or LEDs are turned off for periods of less than $\frac{1}{16}$ to $\frac{1}{24}$ second, the off time will not be noticed by a viewer and the image will appear to be steady.

4. The LED light device has LED light effects and air related function(s) with special effects may be a power fail or flashlight light while the AC power lost.

5. The LED light device has LED light effects and air related function(s) with special effects may have rotating system inside to show the special effects or to offer desired direction with pre-determined air related function(s).

6. The spin means of the LED light device has LED light effects and air related function(s) with special effects may be a motor with fan blades having LED(s) or LED array install on a substrate or flexible PCB arranged on the said at least one of fan blade or rotating blade similar with FIG. 10.

7. The spin means of the LED light device has LED light effects and air related function(s) with special effects may be at least one motor and preferred gear-set(s) incorporate with bars that include a flexible PCB or substrate to install the LED(s) or LED array on the at least one of bars similar with FIG. 9.

8. The spin means of the LED light device has LED light effects and air related function(s) with special effects may be a motor connect with frame or bracket or supporter or substrate to install the LED(s) or LED array on the frame or bracket or supporter or substrate similar with FIG. 8.

9. The spin means of the LED light device has LED light effects and air related function(s) with special effects may be a motor with a round disc substrate to install the LED(s) or LED array on the disc similar with FIG. 11.

10. The spin means of the LED light device has LED light effects and air related function(s) with special effects may be a motor with a geometric shape substrate to install the LED(s) or LED array with the geometric shape substrate similar with FIG. 12 and FIG. 13.

11. The LED light device has LED light effects and air related function(s) with special effects may include a switch, sensor, and/or timer means to control the circuit to provide predetermined functions similar with FIGS. 2, 5, 6, 7.

12. The power source of the LED light device has LED light effects and air related function(s) with special effects may come from a battery, USB outlet, cigarette plug, USB wires, male lamp-base, generator, chemical power source, green power source, wind power source, outlet, extension cord, power strips or other power generator device(s) similar with FIGS. 2, 3, 4, 5, 6, 7.

13. The LED light device may be an LED light device has LED light effects and air related function(s) with power saving features, including: at least one LED for a light source, and at least one housing having space to install circuit, conductive kits or piece, power fail system, flash-light sets, night light sets, wireless controller, IR or RF remote controller, Wi-Fi system, download APP system, electric components parts and accessories, switch(es), sensor(s), an integrated circuit (IC), and/or micro controller to connect with a conventional market-available AC or DC or power storage device(s) by prong or USB wire or cigarette-plug connect with power source to cause the said LED or LEDs to turn on and off according to a predetermined function, effects, duty cycle, color, and brightness, the LED or LEDs turning off for a certain percentage of each cycle that is shorter than the time required to meet the persistence of vision of human eye, i.e., more quickly than the human eye's response time of $\frac{1}{24}$ to $\frac{1}{16}$ second as noted above, so that the blinking LED or LEDs will appear to be continuously on.

14. The LED light device has LED light effects and air related function(s) with special effects may have the additional cost saving feature, in case the power source is batteries, wherein the total batteries' voltage is less than the LED or motor or additional function(s) trigger voltage, the light device including voltage boosting components and related parts and accessories to increase the lower voltage to over the LED or motor or additional function(s) trigger voltage. Wherein, the said LED light also have following feature(s);

1. A plug-in LED light has LED light effects and air related function(s) having replaceable & rechargeable battery or batteries assembly 2. At least one of the said Plug-In LED light has LED light effects and air related function(s) having at least one AC-to-DC circuit to get DC current to supply DC current to at least one (A) LED or LEDs; or (B) built-in or replaceable rechargeable battery; or (C) air related functions(s); or (D) optional added functions.

3. A plug-in LED light has LED light effects and air related function(s) having replaceable & rechargeable battery or batteries assembly.

4. The said LED light battery connect with or without the DC current voltage booster circuit which is additional cost saving feature, wherein the total batteries voltage is less than trigger voltage needed for LED(s) or air related functions or added function(s).

5. A plug-in LED light has LED light effects and air related function(s) having no replaceable & rechargeable battery assembly, 6. The said total voltage of none replaceable rechargeable battery-assembly is less than the LED(s), or light source, or air related functions or other functions' trigger or operation voltage, 7. The plug-in LED light has LED light effects and air related function(s) having replaceable & rechargeable battery or batteries assembly to be charged by outside transformer, power bank, solar module DC storage device.

8. The said battery-assembly or light device including at least one of voltage boosting circuit incorporate with preferred IC, or components and related parts and accessories; to increase the lower battery-assembly's voltage to over or higher than the LED, or air related functions, or added function(s), or other electric functions trigger or operation voltage.

9. The plug-in LED light has replaceable & rechargeable battery or batteries assembly be charged by cigarette plug power source or male lamp-holder base while plug the plug into cigarette female receptacle or female bulb-base receptacle.

10. The Plug-In LED light has LED light effects and air related function(s) having battery-assembly has compartment to install No. 1 to N (Any number) of rechargeable batteries through LED light built-in type-A or type-C USB export port(s) while the LED light is not plug-in the said AC outlet 11. The plug-in LED light has LED light effects and air related function(s) having rechargeable battery and wireless charging set(s) to supply DC power to the other electric device by wireless charging and wireless receiving set(s).

12. The plug-in LED light has LED light effects and air related function(s) having rechargeable battery has its compartment and can easily install, replace, assembly, disassembly the battery and has easily open, close of the battery cover, hinge, door.

13. The plug-in LED light has LED light effects and air related function(s) having compartment is part of the LED light.

14. The plug-in LED light has LED light effects and air related function(s) having at least one rechargeable battery fit into built-in compartment space, and LED light incorporated with booster circuit, IC, related electric parts & accessories to raise the less battery-assembly DC voltage to higher DC voltage to has enough higher DC voltage to charge or supply the DC power to the other electric device(s) or products has built-in the said battery-assembly.

15. The plug-in LED light has LED light effects and air related function(s) having rechargeable battery assembly to supply DC power to the be charged product(s).

16. The plug-in LED light has LED light effects and air related function(s) having at least one of charging circuit(s) to charge the said rechargeable batteries while the LED light has AC power.

17. The plug-in LED light has LED light effects and air related function(s) having rechargeable battery assembly to supply DC power to the fan related parts.

18. The plug-in LED light has LED light effects and air related function(s) having at least or more than one of function or parts select from;
  (AA) AC plug-in outlet multiple functions LED light,
  (BB) Power fail night light,
  (CC) LED light, flashlight,
  (DD) AC outlet Plug-in USB Charger products, or
  (EE) Portable DC Power bank has USB wires has 2 USB-plug for electric delivery.
  (FF) AC outlet plug-in electric device has at least one add functions but not limit any combination from
  (a) motion sensor,
  (b) remote controller,
  (c) blue-tooth connection,
  (d) wireless controller,
  (m) wireless communication,
  (n) camera,
  (o) recording,
  (p) microphone.

BRIEF DESCRIPTION OF THE DRAWINGS

FIG. 4A show the one of preferred construction of the plug-in LED light has LED light effects and air related function(s) having at least or more than one of function or parts or electric component(s) and the said LED light has built-in or incorporated cigarette-plugs to insert into moving equipment including car, truck, bus, boat, vessel, air-craft, or other traffic device female cigarette-receptacle(s) or socket(s) to charge the said plug-in LED light same as FIG. 1 prongs.

FIGS. 8, 9, 10, and 11 show a preferred embodiment having rotating device including motor and gear-set, clock movement, magnetic reaction piece or coil-set(s); and spin device drive the geometric shape LED light having built-in fan or blade(s) with preferred flexible PCB or soft substrate to install plurality LED(s) or LED array controlled by the IC and lighting control system to form a message, light pattern, color changing pattern, and/or time display for (1) night time use light, (2) night light, (3) power fail light, (4) flashlight, (5) cigarette plug light, (6) motion, radar, photo sensor light, (7) IR or RF remote control light, (8) Wireless control light, (9) recess light for indoor ceiling installation, (10) LED plug-in AC outlet light.

DETAILED DESCRIPTION OF PREFERRED EMBODIMENTS

Figure 1:
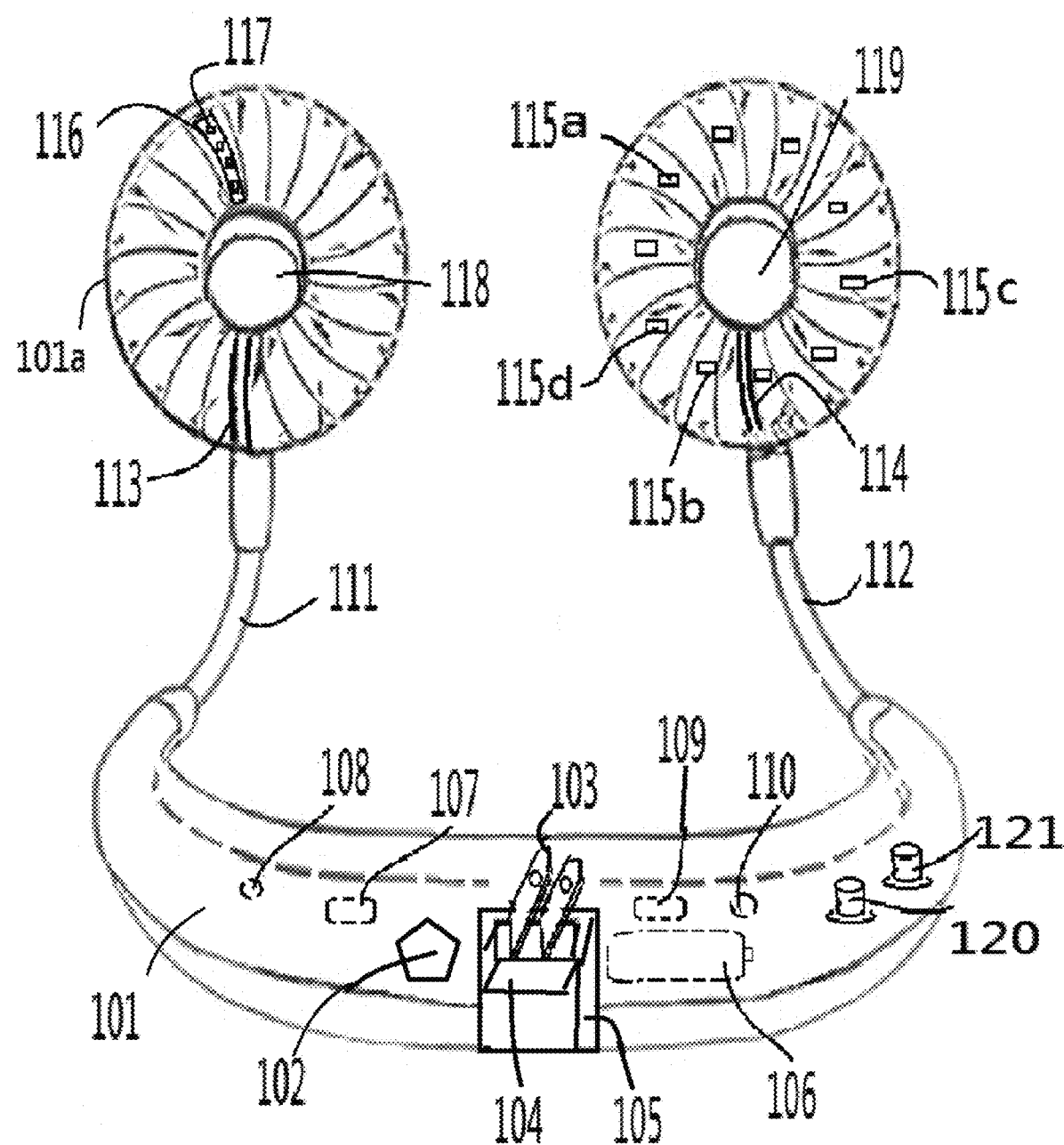
FIG. 1 show a first preferred embodiment of the current invention, the plug-in LED light has LED light effects and air related function(s) having optional at least or more than one of function or parts or electric component(s) for night time use, power fail, flashlight, message or pattern display presentation with wired or wireless control system.

As explained above, the current invention may apply the persistence of vision effect to enable the LED(s) or LED array to form light patterns such as color changing and/or color selection patterns, or a time, date, message, patterns display. The effect is based on the inertia of the human eye which has a response time of around 1/24 to 1/16 second. Hence, the LED(s) or LED array light can be controlled to change faster than the 1/24 (41.67 mini second) to 1/16 (0.0625 second) second response time so that even though an object moves faster than the human eye response time. So, the last image stays in the human eye and brain for a time period. This effect is possible because the LED response time is very short, around 10 mini second or less. Hence, if an object appears in front of the human eye for more than 16-24 pictures in a second, people will think all pictures are continuous. Hence, the current invention uses appropriate circuits, control system, IC, wireless controller, IR or RF remote controller, Wi-Fi and download APP software, Z-way or Zig-Bee wireless system, and/or a micro controller to cause the LED or LEDs to blink much faster than 16-24 times (cycles) per second, with each cycle having a 10% turn-on duration and 90% turn-off duration to save up to 90% of the power consumption or increase battery life up to nine times more than would be the case with a full steady-on condition. This is a significant power saving for all battery power source applications so can offer more power for built-in LED light air related function(s). It will further be appreciated that new LED technology may be coming soon which will make the LED have an even quicker response time of less than 10 mini second, perhaps 5 mini second time or 2 mini second to provide even more power saving but still fall within the current scope for any update or improvement of the LED(s). To adjust the less turn-on and longer for turn-off duration time for each cycle will enable more power saving devices to meet the green world concept.

To provide further cost saving in the case of a battery-powered unit, the preferred light device can use update rechargeable batteries with a voltage; the battery be charged by (a) built-in AC-to-DC circuit or (b) external transformer or (c) DC energy storage unit(s) or (d) DC power bank by (i) prong or (ii) conductive-wire or (iii) USB-wire or (iv) cigarette-plug; for enough DC voltage to charge the build-in or detachable rechargeable battery inside LED light housing.

The one of alternative cost saving arrangement which incorporate with less rechargeable batteries which inside the LED light compartment where has (1) the booster circuit and booster circuit raise 1-piece rechargeable battery voltage from lower voltage change to enough voltage to drive the LED(s), air related function(s). So, the current invention for cost saving circuit for LED light is big features and also had detail more features as below listed 1 to 18 points and also show 38 features on following text to show features of each page drawing.

1. A plug-in LED light has LED light effects and air related function(s) having replaceable & rechargeable battery or batteries assembly 2. At least one of the said Plug-In LED light has LED light effects and air related function(s) having at least one AC-to-DC circuit to get DC current to supply DC current to at least one (A) LED or LEDs; or (B) built-in or replaceable rechargeable battery; or (C) air related functions(s); or (D) optional added functions.

3. A plug-in LED light has LED light effects and air related function(s) having replaceable & rechargeable battery or batteries assembly.

4. The said LED light battery connect with or without the DC current voltage booster circuit which is additional cost saving feature, in case the battery or battery-assembly, wherein the total batteries voltage is less than trigger voltage needed for LED(s) or air related functions or added function(s).

5. A plug-in LED light has LED light effects and air related function(s) having no replaceable & rechargeable battery or batteries assembly, 6. The said total voltage of none replaceable rechargeable battery-assembly is less than the LED(s), or light source, or air related functions or other functions' trigger or operation voltage, 7. A plug-in LED light has LED light effects and air related function(s) having replaceable & rechargeable battery or batteries assembly to be charged by outside transformer, power bank, solar module DC storage device.

8. The said battery-assembly or light device including at least one of voltage boosting circuit incorporate with preferred IC, or components and related parts and accessories; to increase the lower battery-assembly's voltage to over or higher than the LED, or air related functions, or added function(s), or other electric functions trigger or operation voltage.

9. The plug-in LED light has replaceable & rechargeable battery or batteries assembly be charged by cigarette plug power source or male lamp-holder base while plug the plug into cigarette female receptacle or female bulb-base receptacle.

10. The Plug-In LED light has LED light effects and air related function(s) having battery-assembly has compartment to install No. 1 to N (Any number) of rechargeable batteries through LED light built-in type-A or type-C USB export port(s) while the LED light is not plug-in the said AC outlet 11. The plug-in LED light has LED light effects and air related function(s) having rechargeable battery and wireless charging set(s) to supply DC power to the other electric device by wireless charging and wireless receiving set(s).

12. The plug-in LED light has LED light effects and air related function(s) having rechargeable battery has its compartment and can easily install, replace, assembly, disassembly the battery and has easily open, close of the battery cover, hinge, door.
13. The plug-in LED light has LED light effects and air related function(s) having compartment is part of the LED light.
14. The plug-in LED light has LED light effects and air related function(s) having at least one rechargeable battery fit into built-in compartment space, and LED light incorporated with booster circuit, IC, related electric parts & accessories to raise the less battery-assembly DC voltage to higher DC voltage to has enough higher DC voltage to charge or supply the DC power to the other electric device(s) or products has built-in the said battery-assembly.
15. The plug-in LED light has LED light effects and air related function(s) having rechargeable battery assembly to supply DC power to the be charged product(s).
16. The plug-in LED light has LED light effects and air related function(s) having at least one of charging circuit(s) to charge the said rechargeable batteries while LED light has AC power.
17. The plug-in LED light has LED light effects and air related function(s) having rechargeable battery assembly to supply DC power to the fan related parts.
18. The plug-in LED light has LED light effects and air related function(s) having at least or more than one of function or parts select from;
(AA) AC plug-in outlet multiple functions LED light,
(BB) Power fail night light,
(CC) LED light, flashlight,
(DD) AC outlet Plug-in USB Charger products, or
(EE) Portable DC Power bank has USB wires has 2 USB-plug for electric delivery.
(FF) AC outlet plug-in electric device has at least one add functions but not limit any combination from
(a) motion sensor,
(b) remote controller,
(c) blue-tooth connection,
(d) wireless controller,
(m) wireless communication,
(n) camera,
(o) recording, light
(p) microphone, For simple understand the current invention for multiple function and application of Plug-in AC outlet LED light has LED light effects and air related function(s) having please refer to FIGS. 1,2,3,4 shown At least or more than one application including
(1) plug-in outlets for nighttime use light or night light,
(2) fasten on bar, pole, tube of bicycle, baby stroller by preferred Velcro tape or clipper,
(3) install ground by stake or legs,
(4) install on metal surface by magnetic piece(s),
(5) installation on desktop, tabletop, flat surface, computer desk,
(6) wear by people on neck, arms;
And,
At least or more than one of LED light function selected from;
(i) LED(s) for nighttime use light
(ii) LED(s) for night light
(iii) LED(s) for power fail or emergency light while has AC power
(iv) LED(s) for flashlight while lost AC power
(v) LED(s) for eye persistence light effects to show continuously image or patterns or message or time related display,
(vi) USB port(s) for input to charge inner rechargeable battery
(vii) USB port(s) for output to charge external be-charged products.
(viii) USB port(s) for power bank to charge other product while lost AC.
(ix) Air related part(s) supply air flow with different speed and air amount
(x) Air related part(s) supply air fresher, fragrancy, essential oil diffusor, Moisture sprayer, or others diffusor or sprayer.
(xi) Air related part(s) supply;
And,
The LED light has at least or more than one of electric components or parts or circuit select from;
(a) IC, or control circuit
(b) Sensor(s), or motion or photo or radar sensor
(c) Switch(s), or push-on-off, twist, rotating, contact, conductive switch
(d) IR or RF remote controller
(e) Wireless system is at least one of Wi-Fi, Wi-Fi extension unit, download APP software, Z-way, Zigbee, Bluetooth.
(f) Conductive piece(s), wire(s), unit(s)
(g) Other electric parts or accessories
And,
To make desired setting, adjusting, selection at least one of
(A) LED(s) color, or auto changing color, select or freeze color, fade-in and fade out effects, or other LED light sequential or flashing function(s)
(B) LED(s) brightness
(C) LED(s) or Air related part(s) turn on-off, duration, cycles, on-time percentage and off-time percentage, speed for each on-off, frequency.

The current invention can include any of the features described above, as described below in connection with FIGS. 1-13:

As shown in FIG. 1 show a first preferred embodiment (100) of the current invention, the plug-in LED light (100) has LED light effects and air related function(s) having optional at least or more than one of function or parts or electric component(s) for night time use, power fail, flashlight, message or pattern display presentation with wired or wireless control system. The said LED light has neck body (101) for comfortable people wearing on neck or arms. The neck body (101) has built-in power fail circuit (102) and folding prong (103) has rotating base (104) fit into compartment (105) to plug into outlet or wall outlets to get AC power. The neck body (101) has built-in AC-to-DC circuit (107) to change AC to DC power to supply to LED(s) and air related parts. The LED light has built-in photos sensor (108). The DC power from AC-to-DC circuit (107) has enough DC voltage to charge inside rechargeable battery (106) while LED light connect with AC power source. The rechargeable battery (106) power supply to the power fail light or emergency light or flashlight with preferred multiple selection position switch including at least auto/off/on to controller the power fail, emergency light, flashlight while lose AC power.

The neck body (101) also have at least or more than one of preferred electric component(s) or parts or accessories selected from photo sensor (108), 1R or RF receiver (109), motion sensor (110), bendable arms (111) (112) to adjust the fan unit(s) (101a) to any direction of 360 degree in horizon or vertical direction, Top of bendable arms (111) (112) is fan unit (101a) which has built-in motor and gear-set (119) to drive the blade(s) (not show) to rotating to create the air flow with different speed to offer different volume of air to desired direction or location.

The fan unit has preferred number of blade(s) to create air flow with pre-determined speed and rpm. At least one of blade had install a flexible PCB (117) has plurality desired color(s) LEDs (116) for desired or different colors to turn on and turn off on predetermined time, duration, on/off time percentage, frequency and rotating of blades is faster than people eyes reaction time so can create vision persistence effect to see LED(s) (116) non-continue on/off time to recognize as continuously linear or time/date display as co-inventor parent filed case as above list (#JJ-2010) (#JJ-1) (#J-2).

The alternative LED(s) (115a) (115b) (115c) (115d) (1160 arrangement including
(1) LED(s) for night light application (115a),
(2) LED(s) for fan application during fan is rotating (115b),
(3) LED(s) for power fail or emergency light application (115c) while lose AC power,
(4) LED(s) for flashlight application (115d) while lose AC power and controlled by multiple position select switch has Auto/Off/On position.

The air related part(s) has at least one recess space (119) to install the air fragrance (118), air fresher (118), essential oil diffusor (118), liquid or moisture or steam sprayer device (118) within space (119).

The LED light has other control or selection switch such as
(a) Fan speed control or selection switch (121),
(b) selection switch (120) has Auto/Off/On multiple position for different function selection;
are different with above discussed different sensor, switch, control system by wire or wireless communication.

It is appreciated all above discussion including parent filed case(s), alternative, improvement, replacement or skill for LED light has built-in air related part(s) as above discussed should still fall within the current invention scope and claim without argument.

Figure 2:
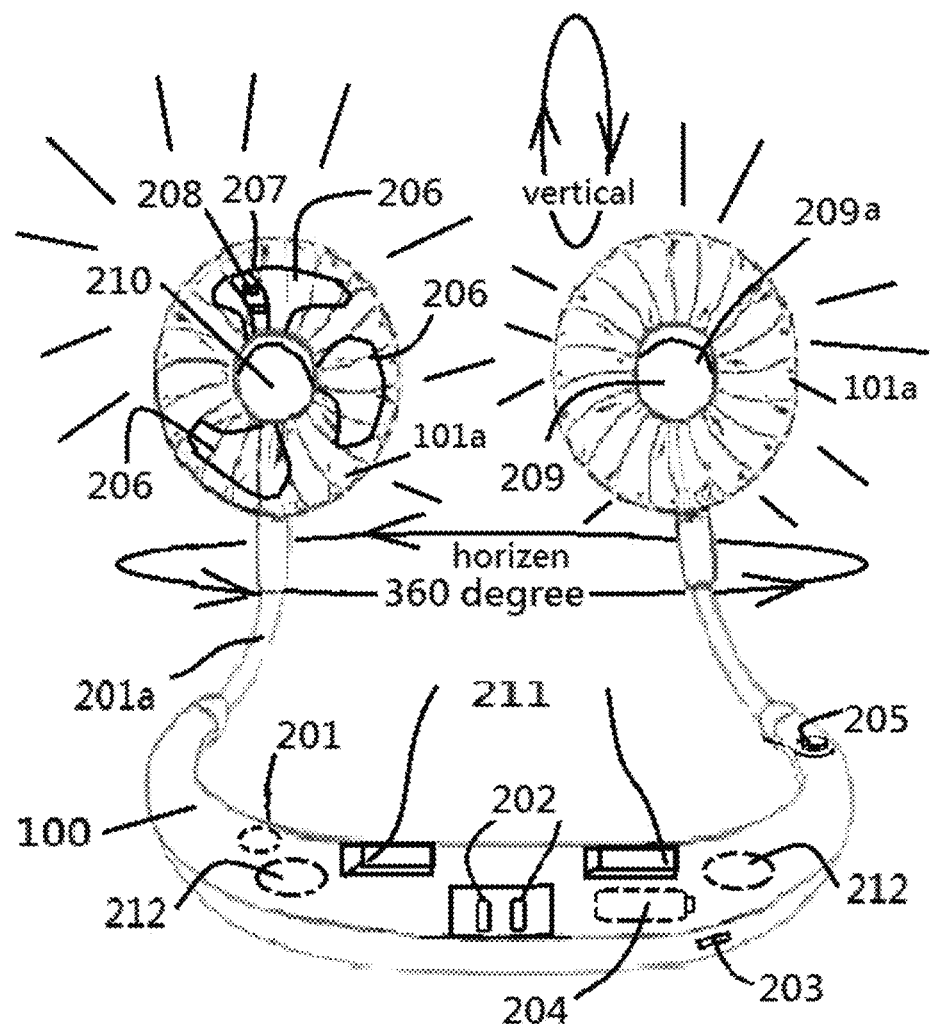
FIG. 2 show more details for FIG. 1 the plug-in LED light has LED light effects and air related function(s) having at least or more than one of function or parts or electric component(s) including blade, flexible PCB for LEDs, IC for light effects, motor and gear set to drive blades to rotating, rechargeable battery, USB ports for input or output power, wireless charger system, flexible or bendable arms to adjust air flow or smell directions, neck construction for people neck wear, adjust or setting switch.

From FIG. 2 show more details for FIG. 1 the plug-in LED light has LED light effects and air related function(s) having at least or more than one of function or parts or electric component(s) including
(i) blade (206) of fan unit (100a),
(ii) flexible PCB (207) for LEDs (208) incorporate with IC (not shown) for light effects,
(iii) motor with or without gear set (210) to drive blades (206) to rotating,
(iv) rechargeable battery (204),
(v) USB ports (203) for input or output power,
(vi) wireless charger system (not shown),
(vii) flexible or bendable arms (201a),
(viii) space (210) to install essential oil (209a) or air fresher (209a) or fragrance (209a) or de-odd smell (209a) unit or diffusor or sprayer with or without rotating cover to spray to preferred directions or areas,
(ix) sensor(s),
(x) magnetic piece(s) to allow unit can install on metal piece(s),
(xi) folding prong (202) so not interfere people wearing comfortable,
(xii) slots or opening (211) for Velcro strips or elastic cord or fasten straps to install unit on baby stroller bar, tube, pole or frame;
to adjust air flow or smell directions, wherein the neck body (100) construction for people neck wear, and at least one of adjust or setting switch (205).

From FIG. 2 also show the bendable arms (201a) can adjustable 360 degree on horizon and vertical so can emit the light and air to any location surrounding the both fan unit (101a). The neck body (100) has folding prong (202) so can let people wear without the prong to make un-comfortable. The neck body also has built-in more than one of slot(s) (211) to let people fasten the LED light with air related parts to baby stroller bar, pole, tube by more than one or two of Velcro-strap or fasten-strip (not shown) or clippers or bungee cord so can easily and solid to fasten on rigid or foldable textile shade of the baby stroller, or others traffic equipment has rigid or soft piece. The neck body has alternative arrangement to install on the metal surface such as refrigerator or metal desk or interior of traffic device by preferred number of strong magnetic piece(s) (212) to increase practical application for the current plug-in LED light with built-in air related parts.

From FIG. 2 show the LED light has more than one of fan unit(s) (101a) which has preferred geometric shape and construction of blade(s) (206) to rotating under plurality different speed or RPM control by speed switch (205) to blow out the desired amount of air flow by control the inner motor and gear-set (210). Top of the motor and gear-set (210) has space (209) to allow people arrange air-fresher (209a), fragrance wax (209a), essential oil (209a) with diffusor functions, moisture sprayer (209a) within to supply more functions for LED light.

From FIG. 2 has built-in USB port(s) (203) which can be type A or type C or micro USB or mini USB (203) or android USB (203) depend on pre-determined requirement for input or output power from the neck body (100).

The said LED light has (1) Plug into wall out work as night light (208) and air flow fan by motor and gear-set (210) and charge the inner rechargeable battery (204) by built-in USB port (203) while connect with AC power.

It also can offer the (a) air-flow fan by motor and gear-set for people wear on body or arms powered by rechargeable battery and LED light effects including illumination, power fail light, flashlight; while the LED light lose the AC power or power fail time.

From FIG. 2 all features also is available for above discussed FIG. 1. All discussion of FIG. 4A should cover all above discussion features and function of FIG. 1. It is appreciated all above discussion including parent filed case(s), alternative, improvement, replacement or skill for LED light has built-in air related part(s) as above discussed should still fall within the current invention scope and claim without argument.

Figure 3:
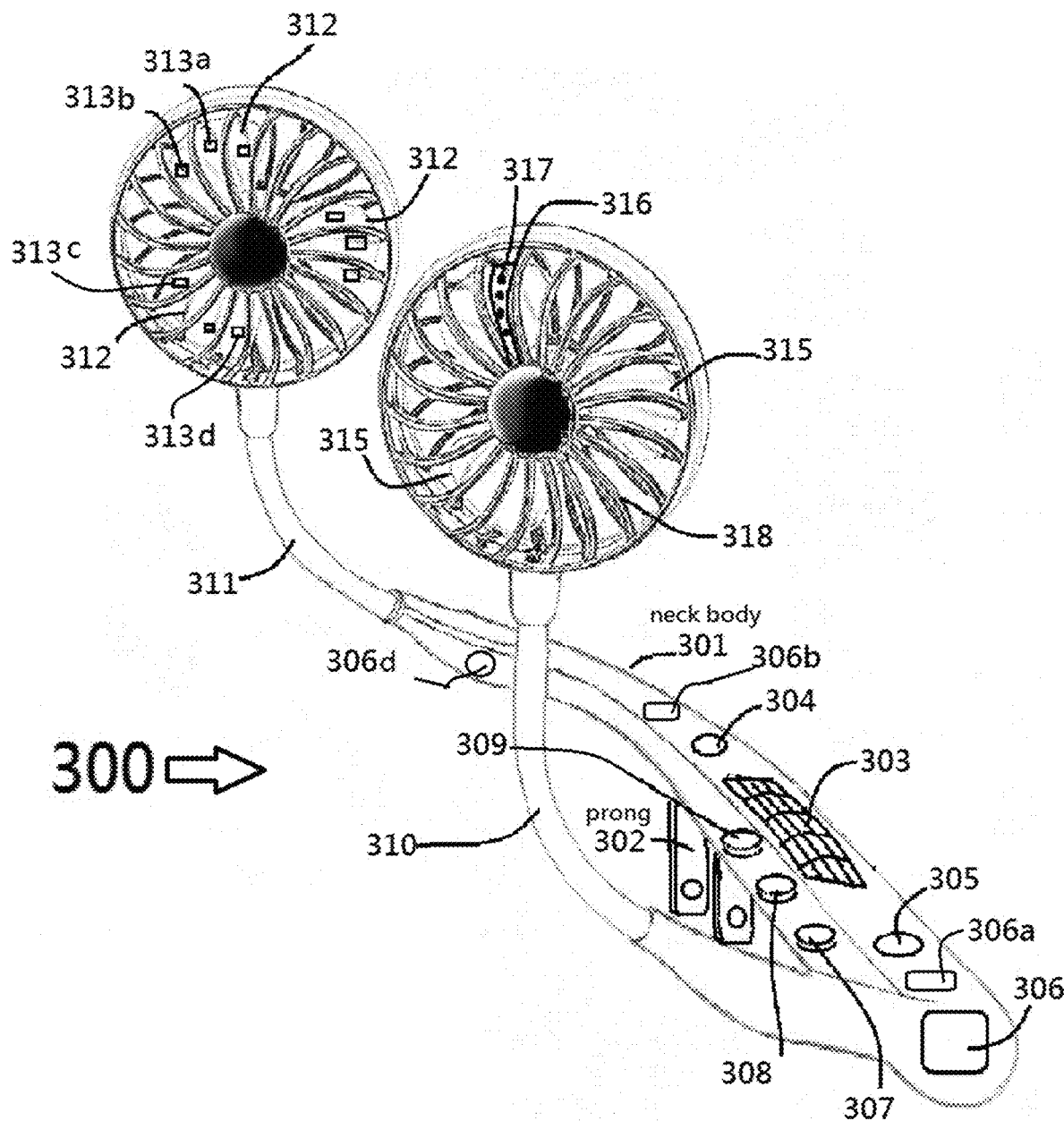
FIG. 3 show more details for FIG. 1 the plug-in LED light has LED light effects and air related function(s) having at least or more than one of function or parts or electric component(s) including all kind of sensor such as motion, photo, radar sensor, wireless receiver, power fail circuit, IC, control circuit, color changing and color selection or flashlight multiple position selection switch, IR or RF receiver, flexible or bendable arms, different functions LEDs for different On/Off time and effects, Flexible PCB with IC controlled plurality LEDs for special lighted image or pattern presentation or display, blades, air fragrance, essential oil diffusor.

From FIG. 3 show more details for FIG. 1 the plug-in LED light (300) has LEDs for different functions including
(1) LEDs (313a) for flashlight, or
(2) LEDs (313b) for power fail light, or
(3) LEDs (313c) for fan or nighttime use light, or
(4) LEDs (313d) for night light, or
(5) LEDs for other functions such as accent light, wakeup light, countdown light, sleeping light, motion sensor light, others sensor light
(6) LEDs (317) install on flexible PCB (316) for eye persistence lighting effects device; those LED(s) for different light application and effects, and air related parts at least have at least one of fan-unit(s) which has at least one of preferred geometric construction or shape blade (s) (312) (315) to offer air flow with speed control switch.

The said air related parts creates at least or more than one of function by parts or electric component(s) including all kind of sensor including motion (303), photo (304), radar sensor (303), wireless receiver (305), power fail circuit (306a), IC or control circuit (306), color changing and/or color selection switch (307), flashlight with multiple position selection switch (309), IR or RF receiver (306d), flexible or bendable arms (310) (311), different functions LEDs (313a) (313b) (313c) (313d) (317) for different On/Off time and effects, brightness switch (308), flexible PCB (316) with IC or control circuit (306) controlled plurality LEDs (313a) (313b) (313c) (313d) (317) for special lighted image or pattern presentation or display, blades (312) (315), air fragrance, essential oil diffusor. The light has folding prong (302) to prevent people from un-comfortable while wearing.

The different applications or functions LED(s) (313a) (313b) (313c) (313d) (317) is controlled by IC or circuit (306) by wired or wireless system.

All discussion of FIG. 3 should cover all above discussion features and function of FIGS. 1, 2. It is appreciated all above discussion including parent filed case(s), alternative, improvement, replacement or skill for LED light has built-in air related part(s) as above discussed should still fall within the current invention scope and claim without argument.

Figure 4:
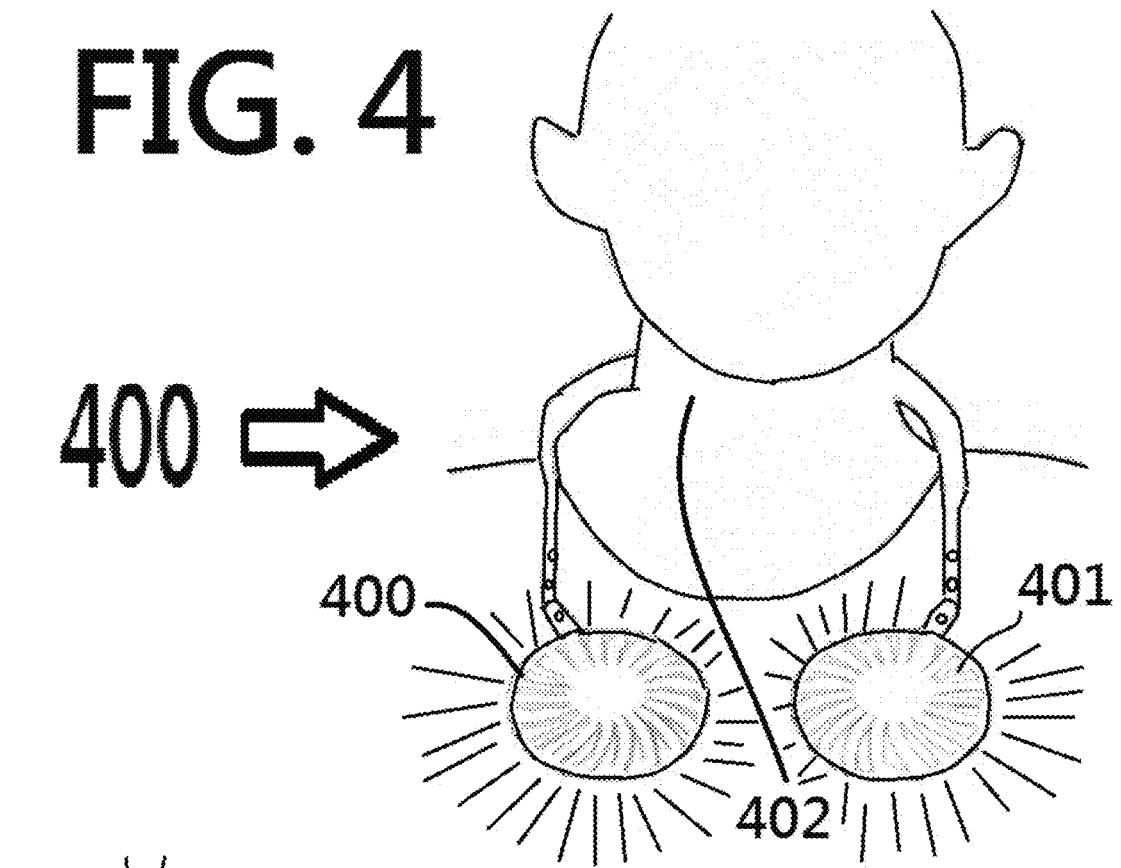
FIG. 4 show one of preferred construction of the plug-in LED light has LED light effects and air related function(s) having at least or more than one of function or parts or electric component(s) and having construction for people body to carry on or attached on neck or arms or legs.

From FIG. 4 show one of preferred construction of the plug-in LED light (400) has LED light effects and two of air related parts(s) which is fan-unit (401) (402) to offer at least one of air flow, air fresher, fragrance, essential oil diffusor, sprayer, or liquid, moisture, steam sprayer. The LED light having at least or more than one of function or parts or electric component(s). The LED light has preferred construction for people (402) to carry on or attached on neck or arms or legs. All discussion of FIG. 4A should cover all above discussion features and function of FIGS. 1, 2, 3.

It is appreciated all above discussion including parent filed case(s), alternative, improvement, replacement or skill for LED light has built-in air related part(s) as above discussed should still fall within the current invention scope and claim without argument.

FIG. 4A show the one of preferred construction of the plug-in LED light (400A) has LED light effects and air related function(s) having at least or more than one of function or parts or electric component(s).

The LED light neck body (101) has built-in or incorporated cigarette-plugs (403a) to insert into neck body (101) USB port (404) by conductive wire (403b) and USB plug (403c) for moving equipment including car, truck, bus, boat, vessel, air-craft, or other traffic device having female cigarette-receptacle(s) or socket(s) to charge the said plug-in LED light same as FIG. 1 prongs. It is appreciated the cigarette-plug (403a) for alternative arrangement to install on neck body (101) to become a built-in cigarette-plug (403a) without conductive wire (403b) and USB-plug (403c) but cigarette-plug is one of folding construction, so not affect people while wearing the LED light.

All above discussion of FIG. 4A should cover all above discussion features and function of FIGS. 1, 2, 3. It is appreciated all above discussion including parent filed case(s), alternative, improvement, replacement or skill for LED light has built-in air related part(s) as above discussed should still fall within the current invention scope and claim without argument.

From FIG. 4A shown the said LED light has ground stake (102) for not flat ground or floor or mud area(s) with desired number of pole (102a) (102b), bar (102a) (102b), tube (102a) (102b) for certain height for people get the desired LED illumination and air related functions. One of preferred alternative to change ground stake (102) to pedestal (103) with base for flat floor or ground to stand up. All discussion of FIG. 4A should cover all above discussion features and function of FIGS. 1, 2, 3, 4. It is appreciated all above discussion including parent filed case(s), alternative, improvement, replacement or skill for LED light has built-in air related part(s) as above discussed should still fall within the current invention scope and claim without argument.

Figure 5:
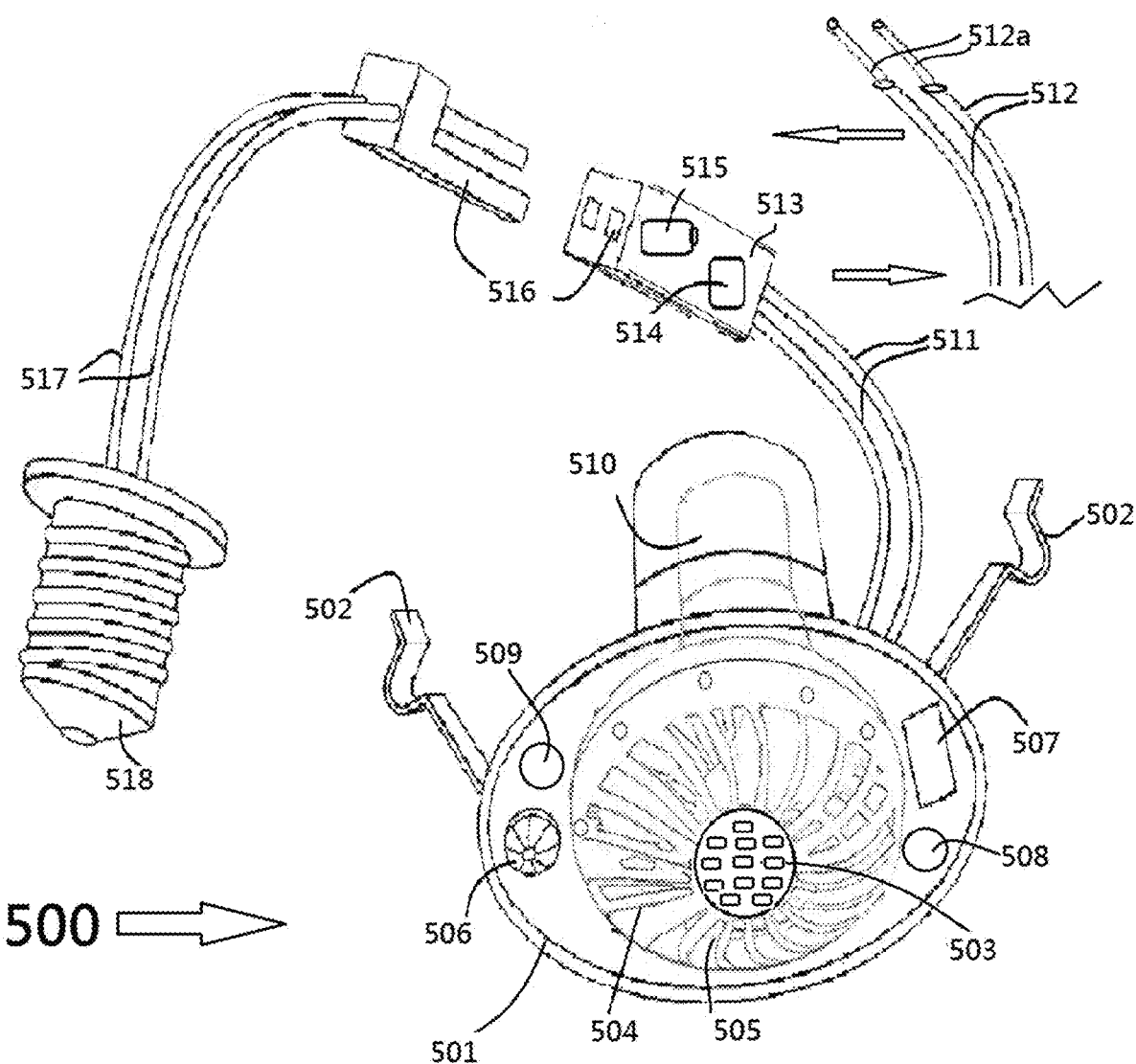
FIG. 5 show a preferred construction for the plug-in LED light has LED light effects and air related function(s) having at least or more than one of function or parts or electric component(s), and LED light is one of LED recess light to offer at least one of LED illumination and air related functions with built-in sensor, remote controller, wireless system, WI-FI and download APP system, Z-way or ZigBee wireless system to set, adjust, select, pickup preferred color, brightness, on time period, on-or-off, light functions, fan or blade speed for variable air-flow amount, with different parts to get power including lamp-base, wired also incorporate with backup rechargeable battery, logic circuit, IC, control system to get desired functions while with or without the AC power.

From FIG. 5 show a preferred construction for the plug-in LED light (500) has LED light source is plurality of LED(s) (503) or LED bulb (510) and air related part(s) including rotating grill ventilation grill cover (504), and fan unit blade (505) to offer at least or more than one of functions.

The LED light is one of LED recess light (500) to offer at least one of illumination by built-in plurality LED(s) (503) or detachable LED bulb or CFL bulb (510), and air related functions including air flow, air fresher, air fragrance, de-odd smell, essential oil diffusor or liquid, moisture, steam spray through the rotating vent grill cover (504) to desired location or direction.

The LED light has fan unit with plurality number of blade(s) (505) with built-in motion or radar or photo sensor (506) and power fail detect sensor and drive circuit (506), IC or circuit (508), remote controller (509), wireless system (509), WI-FI and download APP system, or Z-way, or ZigBee wireless system (509) to set, adjust, select, pickup preferred color, brightness, on time period, on-or-off, light functions, fan unit's blade (505) speed for variable air-flow amount and air spread out by rotating vent grill or vent housing (504).

The recess LED light housing (501) has different parts to get power source including lamp-base (518), wired (512) (512a), and both incorporate with backup rechargeable battery (515), logic circuit unit with AC-to-DC circuit (513or), IC (508), wireless control system (509) to get desired functions while with or without the AC power. It is appreciated all above discussion including parent filed case(s), alternative, improvement, replacement or skill for LED light has built-in air related part(s) as above discussed should still fall within the current invention scope and claim without argument.

From FIG. 5 show LED light (500) has installation clipper (502) to install the recess light on one of preferred location here is indoor ceiling. The Built-in LED(s) (503) or LED/CFL bulb (510) and air related parts (504) (505), and power fail sensor and circuit (507), and IC or circuit (508), and wireless controller or IR or RF receiver (509) of built-in or detachable LED/CFL bulb unit (510) is install within the recess LED light housing (501).

Furthermore, the LED recess light powered by
(A) conductive wire (512) (512a) with or without the quickly connector, or
(B) male lamp base (518) with or without the quickly connector (516) to connect original female lamp-socket (not shown) inside ceiling; both go through the logic circuit unit (513) has built-in rechargeable battery (515) and logic circuit and AC-to-DC circuit (514) to change AC power to get DC power for LED(s) and air related part(s).

It is appreciated all above discussion including parent filed case(s), alternative, improvement, replacement or skill for LED light has built-in air related part(s) as above discussed should still fall within the current invention scope and claim without argument.

The said logic circuit (513) not only detect the AC power existing or not but also determine to supply DC power from rechargeable battery while lose AC power, and the moving or motion or radar detector sense the people moving while turn off AC power.

The one of alternative design for logic circuit unit (513) function to incorporate with pre-program switch that has N times turn-on and turn-off switch within limited time so logic circuit will supply pre-determined AC or DC current to only one single recess light and not to whole electric loop which has at least one of recess light those without built-in air related part(s).

This means logic unit to judge which one recess light has built-in fan related part(s) of plurality of recess light(s) in a electric loop should supply DC power from rechargeable or AC power source basing on pre-program switch turn-on and turn off for N-times within limited time. The logic circuit only supply DC or AC power to the only one recess light with built-in air related part(s) for (a) only air related part(s) turn on, or (b) only LED(s) turn on, or (c) both air related and LED(s) turn on at the same time while sensor detected people existing under dark environment. So, logic circuit incorporate with pre-program system and turn on only one LED light having built-in air related part(s) by pre-program system setting N-times On and Off of electric-loop so not turn on all simple recess light is most important features for the current invention. Only turn on one LED light has built-in air related parts while electric loop lost AC power. It is appreciated all above discussion including parent filed case(s), alternative, improvement, replacement or skill for LED light has built-in air related part(s) as above discussed should still fall within the current invention scope and claim without argument.

Figure 6:
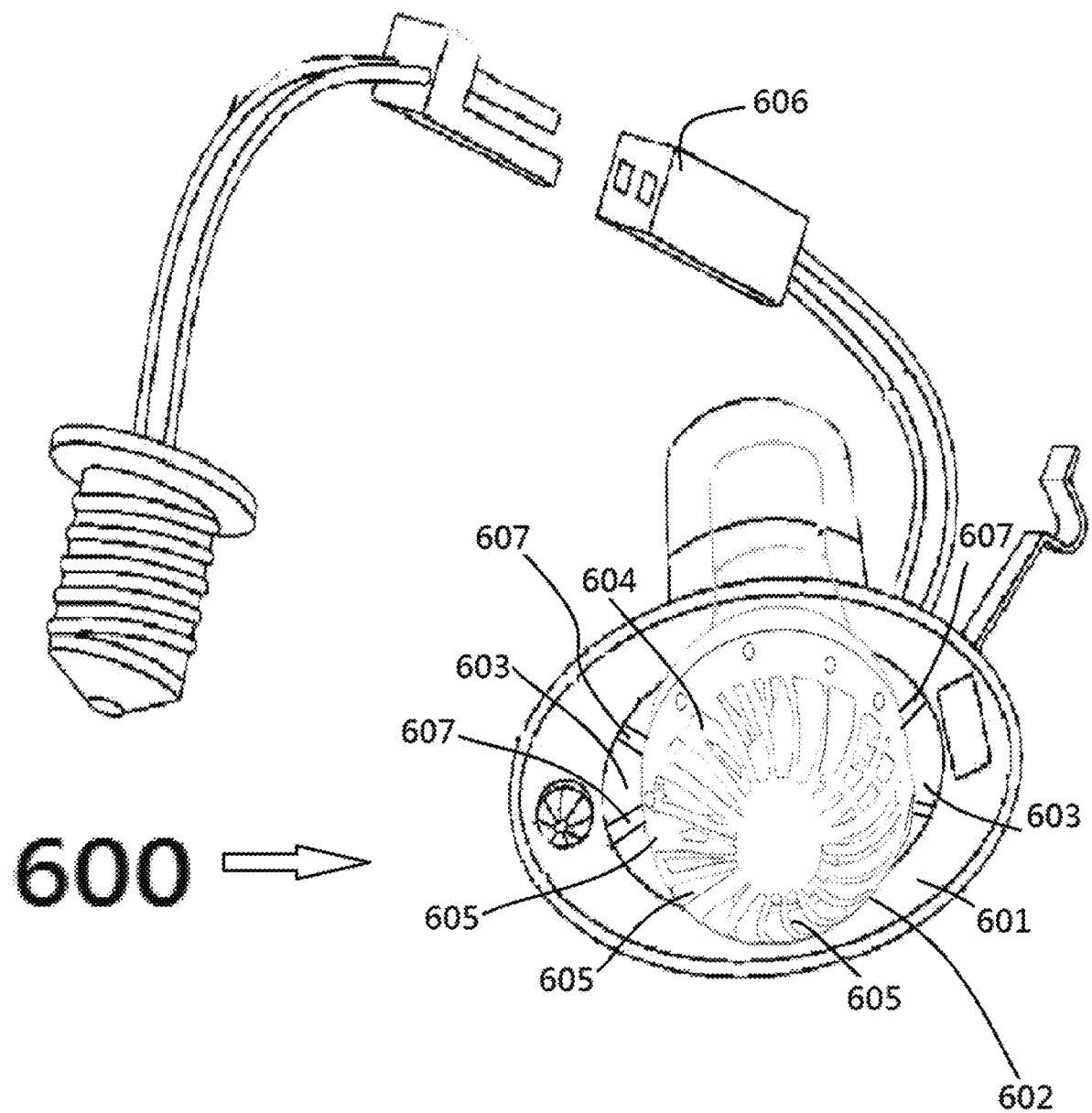
FIG. 6 show alternative construction for the recess LED light wherein the said fan or air related parts is above not lower or recess than the LED light surface and have enough inlet space to get more air from inlet space and LED light having supporter or arms or bars with lower body which has built-in LEDs for illumination.

From FIG. 6 show alternative construction for the recess LED light (600) wherein the said fan or air related parts including parts above the surface (602), air inlet space (603), air outlet space (604), rotating grill cover to spread air or fragrance to desired locations (605), and fan unit blade(s) (not shown; are above the recess LED light surface. Because the LED light has enough inlet space (603) to get more air from inlet space so can blow out enough air flow, or air fresher, or essential oil diffusor, or spray liquid/moisture/moisture from outlet areas.

The LED light has supporter (607) or arms (607) or bars (607) with lower body recess light housing (601) which has built-in LEDs (not shown) for illumination. The said air-related part(s) housing (602) is above the surface of recess light, and air inlet areas (603), and air outlet areas (604), and rotating grill or cover (605) to spread air or fragrance or essential oil diffusor to preferred directions or areas. The different with FIG. 5 of FIG. 6. FIG. 5 air related parts is recess arrange on the LED light housing. The FIG. 6 the air related parts is above the LED light housing surface so can get more bigger inlet and outlet space or area(s) to move more air, fragrance, essential oil diffusor to wider space(s).

It is appreciated all alternative, improvement, replacement or skill for LED light has built-in air related part(s) should still fall within the current invention scope and claim without argument. It is appreciated all above discussion including parent filed case(s), alternative, improvement, replacement or skill for LED light has built-in air related part(s) as above discussed should still fall within the current invention scope and claim without argument.

Figure 7:
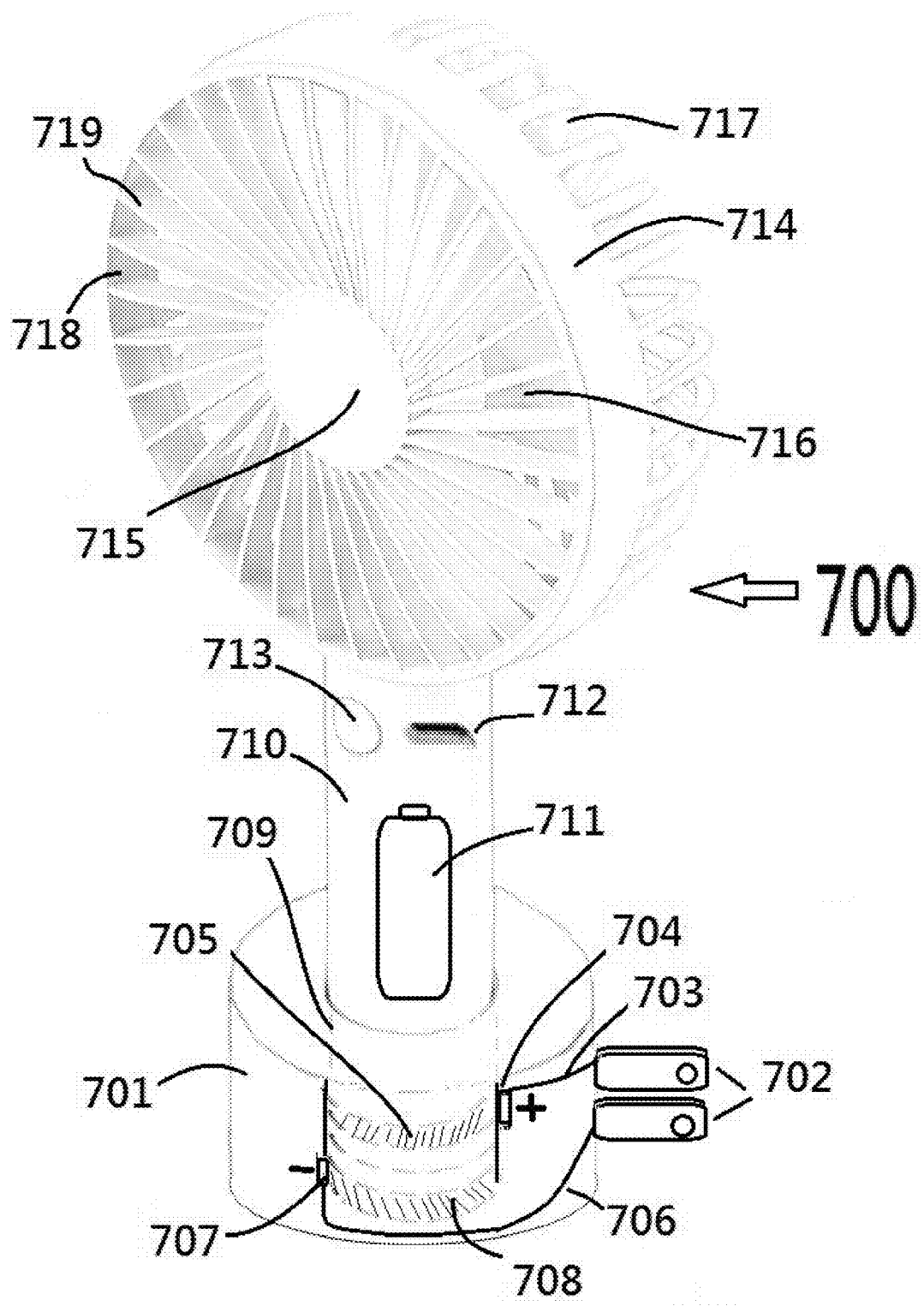
FIG. 7 show alternative construction for the plug-in LED light has LED light effects and air related function(s) having at least or more than one of function or parts or electric component(s), and the LED light has prong base with prong and (+)(−) charging contacts to deliver the (+)(−) into up-body inner built-in rechargeable battery and circuit(s) to make the air related parts to operate pre-determined function(s) with input or output USB port(s) with preferred switch(s) for set, adjust, select preferred functions.

From FIG. 7 show alternative construction for the plug-in LED light (700) has LED light effects and air related function(s) having at least or more than one of function or parts or electric component(s).

The LED light (700) has separated and distinct prong base (710) with prong (702) and (+) wire (703+) to connect with inner recess body (709) and (+) contactor (704+); and (−) wire (706) to connect with inner (−) contactor (707) to deliver the (+)(−) through separated fan unit (714) contact +Ring (705) and −ring (708) and go through the built-in AC-to-DC circuit to delivery DC current into up-body (710) inner built-in rechargeable battery (711) to make the air related parts including motor and gear set (715) to rotating, and incorporate with rotating or non-rotating front cover or grill to make desired direction air or fragrance or essential oil diffusor to preferred areas.

The upper body (710) has built-in fan unit (714) has desired air inlet (717) and outlet (718) to operate pre-determined function(s). Furthermore, the LED light fan unit (714) with rotating grill cover (719) and fan-unit (714) has built-in input or output USB port(s) (712) and preferred switch(es) (713) for set, adjust, select preferred functions.

From FIG. 7 the fan unit (714) has cover or grill (719) is one of rotating unit so can spread the underlay arrangement motor (715) to rotate (715) blade (716) for different speed(s) to create desired air flow, or fragrance or essential diffusor located from the air outlet-area which is at top of motor and (715) to desired location(s) or area(s).

It is appreciated all above discussion including parent filed case(s), alternative, improvement, replacement or skill for LED light has built-in air related part(s) as above discussed should still fall within the current invention scope and claim without argument.

From FIG. 8 is one of co-inventor parent filed case and FIG. 8 shows LEDs (8g) (8g') (8g") and LEDs (8h) (8h') (8h") installed on a frame or substrate (80) which assembled with spin device maybe a more or clock movement (not shown) inside a base housing (8c). The frame or substrate is sealed within a transparent ball shaped housing (8a) to allow people to see the LEDs' light performance for desktop or outlet plug-in applications. The base (not shown) of the light device may be arranged to absorb vibrations when the light device is put on a desktop or plugged-into an outlet.

From FIG. 9 is one of co-inventor parent filed case and FIG. 9 shows a light device with a soft material substrate (9f) in a bar shaped design with a dome center area to deliver electricity by conductive means (9d) and a conductive axis (9b) of a spin means. The dome center area enables assembly of the bars with respect to the spin mean axis to cause the two bars to rotate when the switch (9j), sensor, or control means is activated. The plurality of LEDs (9g) (9h) (9i) can be any number to form a message display having a desired color, brightness, time, message, and words for presentation to a viewer. The LED or LEDs connect with a circuit board or micro controller for time display (such as PIC 16F84) having an integrated circuit (IC) that can display the time, message, or words according to conventional market available skill. The spin means (not shown) can be a motor and is sealed within a motor housing (9) with fastening means assembled with all related parts and accessories e for desktop or plug-in application to make the final LED device.

From FIGS. 10 and 11 is one of co-inventor parent filed case and the light device of FIGS. 10 and 11 is similar to that of FIG. 9 and has the same LED or LEDs (10d) (11e) on a fan-blade (10c) or round disc (11c) arranged to rotate about the axis of a spin means to create a desired light performance. These light devices can be combined with a pre-ferred housing to become a final LED light device as shown in FIGS. 12 and 13.

Figure 12:
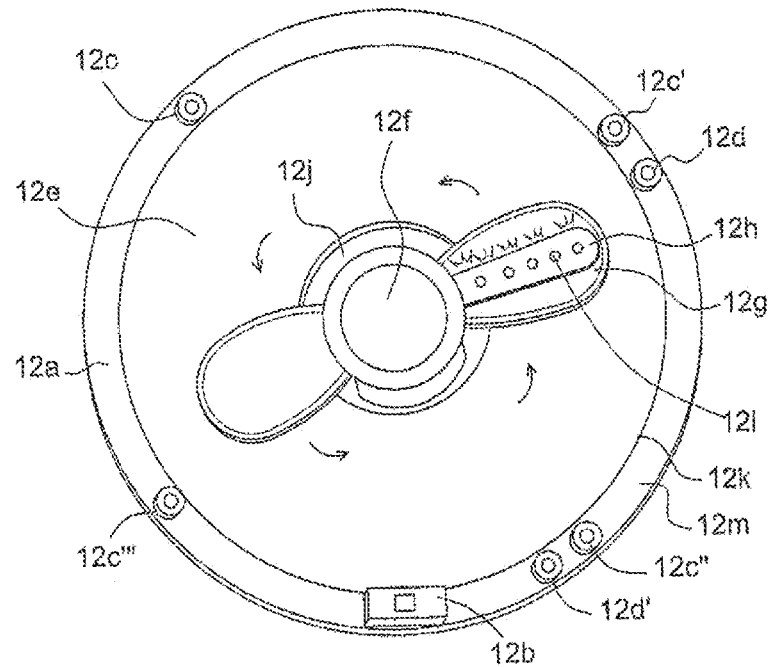
FIGS. 12 and 13 illustrate one of the splendid light image effects created by the current invention from a round shape LED light has prong plug-into AC outlet and also has plurality of LED(s) or LED arrays installed on flexible or soft or preferred PCB with IC or control system to make the rotating speed that change faster than the slow human eye reaction time.
Figure 13:
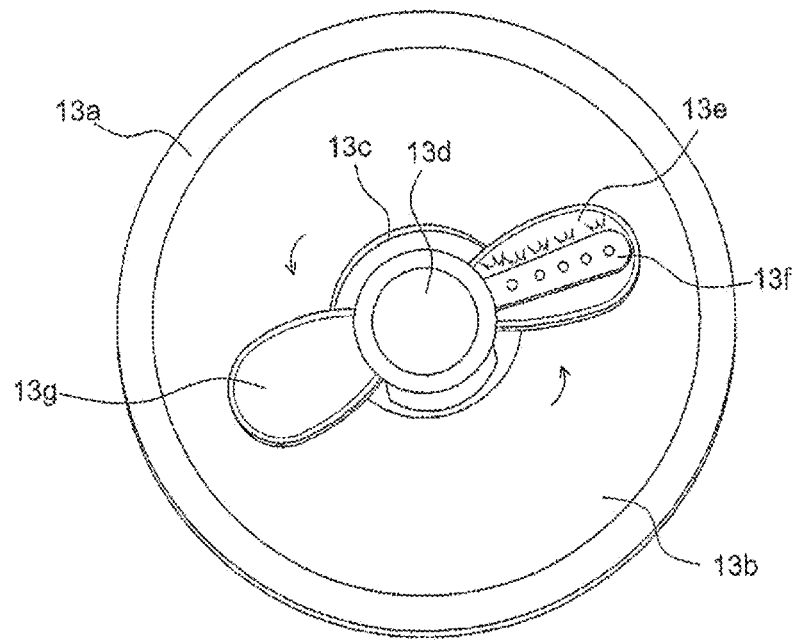

From FIGS. 12 and 13 is one of co-inventor parent filed case and FIGS. 12 and 13 show how to arrange the preferred embodiments of FIGS. 7, 8, 9, and 10 into a housing to become a final LED device with special effects. The device may have any of a switch, sensor, timer, control means, circuit, micro controller, IC, conductive means, motor means and power source to enable it to have a special LED light performance.

For Cost saving and light-weight consideration, The current invention preferred to use the market available all kind of rechargeable battery such as (AAA) or (AA) or (Sub-C) or (C) or (D) or (F) batteries which can easily get from all Chain stores and not use the expensive special non-replaceable batteries which use for i-phone, i-pad so people can get the reasonable and cheap and everywhere rechargeable batteries to save cost than throw away non-replaceable battery communication device or consumer electric device or computer device.

For Light weight consideration, the current invention preferred to use the anywhere easily purchase (AAA) (AA) (Sub C) (C) (D) (F) or other size rechargeable battery and only use at least one which has only 1.2 V incorporate with voltage booster circuit, IC, related parts & accessories to kick up or raise from 1.2V or 2.4V or 3.6 Volt to higher voltage to meet the trigger or operation or working voltage for light source, device, functions required. The current invention uses the least number of replaceable & rechargeable battery or batteries assembly so can work as market available all kind of POWER BANK to people to operate the power out device at any time. The current invention also consider people to carry the market available power back which is too Big and too heavy and only 1 functions just for supply DC power, so add the less number of replaceable & recharge battery or batteries-assembly so can have same function as all market power bank but the current invention offer (1) Not only supply DC current like power bank but less battery with booster circuit is the lighted weight But Also (2) The current invention the lightest weight power back is built-in with the main products including the USB-Charger or LED night light or LED multiple functions light or LED power fail light or motion sensor LED light those all are plug-into the AC outlet device.

From above FIG. 1, 2, 3 also disclosure the foldable prong can interchange to all kind of the different prongs for different country as market available type to insert the other country plug-unit overlay and insert the existing prong so can meet each country's safety standard for the prong specification. The said current invention all prong is two prong-pins without the ground-pin. It is appreciated the current invention the all two prong-pins unit can also use the three prongs which including the ground-pin.

The current invention has all below unique features as below and support by related drawing including;
1. The LED night light has LED light effects and air related function(s), comprising;
At least one LED for preferred LED light effects.
At least one air related part(s) select from (a) blade(s), (b) motor, (c) gear set, (d) speed control, (e) speed selection switch.
At least one of AC-to-DC and DC-to-DC circuit supply pre-determined DC power to both LED(s) and air related part(s) while LED night light plug-in AC outlet and AC outlet has AC power.
2. The LED night light has LED light effects and air related function(s) as No. 1, the LED light has built-in foldable prong to plug into outlets.
3. The LED night light has LED light effects and air related function(s) as No. 1, the LED light has neck body construction and bendable arm(s).
4. The LED night light has LED light effects and air related function(s) as No. 1, the LED(s) incorporate with IC or control circuit to create variety LED light effects, performance.
5. The LED night light has LED light effects and air related function(s) as No. 1, the preferred combination of air related part(s) offers at least one of (a) air flow, (b) air fresher, (c) fragrance, (d) essential oil diffusor, (e) humility or steam or moisture sprayer.
6. The LED night light has LED light effects and air related function(s) as No. 1, the light has motor or spin device to make blade(s) rotating to create air flow with setting, adjusting, selection switch to get desired amount of air flow.
7. The LED night light has LED light effects and air related function(s) as No. 1, the light has built-in power fail sensor to detect the power fail and turn on the power fail light or emergency light which powered from built-in rechargeable battery; and control by more than one position or auto-off-on selection switch.
8. The LED night light has LED light effects and air related function(s) as No. 1, the light has preferred control parts or accessories selected from
  (1) auto-off-on selection switch,
  (2) blade(s) rotating speed switch,
  (3) photo sensor,
  (4) motion, or moving, or radar sensor,
  (5) IR or RF remote control receiving unit,
  (6) Wired or wireless control system,
  (7) WI-FI and download APP system,
  (8) Z-way or Zigbee wireless controller system,
  (9) blue tooth connection system;
to make setting, adjusting, selection at least one of color, brightness, on/off, air related functions, LED light effects.
9. The LED night light has LED light effects and air related function(s) as No. 1, the light has at least on bendable arms(s) to make air related part(s) or at least one the fan unit(s) to change direction of at least one light illumination and air flow within horizon and vertical orientation.
10. The LED night light has LED light effects and air related function(s) as No. 1, the LED light has at least one following application select from;
  (1) plug-in AC outlets for nighttime use light or night light,
  (2) fasten on bar, pole, tube of bicycle, baby stroller by preferred Velcro tape or clipper or other fasten-kits,
  (3) install ground by ground-stake or pedestal-set,
  (4) install on metal surface by magnetic piece(s),
  (5) installation on desktop, tabletop, flat surface, computer desk,
  (6) wear by people on neck, arms.
  (7) be charged by AC outlet or cigarette-plug or external DC power with proper circuits.
11. The LED night light has LED light effects and air related function(s) as No. 1, the LED light has at least one of following function(s) selected from;
  (xii) LED(s) for nighttime use light while has AC power.
  (xiii) LED(s) for night light while has AC power.
  (xiv) LED(s) for power fail or emergency light while lost AC power.
  (xv) LED(s) for flashlight while lost AC power.
  (xvi) LED(s) for eye persistence light effects to show continuously image or patterns or message or time related display.
  (xvii) USB port(s) or prong or cigarette-plug through circuitry for input power to charge inner rechargeable battery.
  (xviii) USB port(s) for output power to charge external be-charged products.

(xix) USB port(s) of light which act as power bank to charge other product while lost AC.

(xx) Air related part(s) supply air flow with different speed and air amount (xxi) Air related part(s) supply air fresher, fragrancy, essential oil diffusor, Moisture sprayer, or others diffusor or sprayer.

(xxii) Air related part(s) supply air flow while plug-in AC outlet, or while people carry powered by built-in rechargeable battery.

12. The LED night light has LED light effects and air related function(s) as No. 1, The LED light has at least or more than one of electric components or parts or circuit select from;

(h) IC, or control circuit or AC-to-DC circuit, or DC-to-DC circuit.

(i) Sensor(s), or motion or photo or radar sensor.

(j) Switch(s), or push-on-off, twist, rotating, contact, conductive switch (k) IR or RF remote controller.

(l) Wireless system is at least one of Wi-Fi, Wi-Fi extension unit, download APP software, Z-way, Zigbee, Bluetooth.

(m) Conductive piece(s), wire(s), unit(s).

(n) Other electric parts or accessories.

13. The LED night light has LED light effects and air related function(s) as No. 1, the IC, or wired or wireless control system; make desired setting, adjusting, selection at least one of (D) LED(s) color, or auto changing color, select or freeze color, fade-in and fade out effects, or other LED light sequential or flashing function(s)

(E) LED(s) brightness.

(F) LED(s) or Air related part(s) turn on-off, duration, cycles, on-time percentage and off-time percentage, speed for each on-off, frequency.

14. The LED night light has LED light effects and air related function(s) as No. 1, LED light has color changing, color selection, auto changing color, freeze color, variable kelvin temperature white color light, mixing colors functions control by wired or wireless control system(s).

15. The LED night light has LED light effects and air related function(s) as No. 1, LED light USB-port(s) connect with external USB-wire one end having male USB-plug and at least one other end is one of DC power source at least including (1) computer, (2) communication device, (3) consumer products, (4) power bank, (5) DC storage device for solar, chemical reaction device, (6) AC-to-DC circuit, (7) external transformer, (8) cigarette female socket; to get input DC to charge internal rechargeable battery.

16. The LED night light has LED light effects and air related function(s) as No. 1, the LED light is powered by AC power while outlet has AC power.

17. The LED night light has LED light effects and air related function(s) as No. 1, the LED light is powered by built-in rechargeable DC battery while the LED light without AC power or while AC outlet is power failed.

18. The LED night light has LED light effects and air related function(s) as No. 1, the LED light has built-in rechargeable battery to supply power while AC outlet lack of AC power.

19. The LED night light has LED light effects and air related function(s) as No. 1, the light beam is emitted from fan-unit to make surrounding area with arts or geometric shape illumination effects after light beam passing through the front and back grill cover and base.

20. The LED night light has illumination and air related function(s), comprising;

At least one of LED(s) to offer desired colors and brightness and emit light from air related part(s).

At least one of air related part(s) within at least one of fan-unit(s).

Where in the LED night light has at least one of built-in AC-to-DC and DC-to-DC circuit to supply preferable DC power to LED(s) and air related parts.

The said LED night light without built-in rechargeable battery.

Wherein, LED night light illuminate at least one of (1) different white color, (2) auto changing color(s), (3) select or freeze colors, (4) sequential flashing, (5) fade in and fade out colors.

Wherein air related part(s) at least offer multiple speed(s) of rotating blade(s) for different air flow amount.

21. At least one of LED(s) to offer desired colors and brightness and emit light from air related part(s), comprising;

At least one of air related part(s) within at least one of fan-unit(s).

Where in the LED night light has at least one of built-in AC-to-DC and DC-to-DC circuit to supply preferable DC power to LED(s) and air related parts.

The said LED night light has built-in rechargeable battery that be-charged while has AC power from outlet, and while lose AC power rechargeable battery to power at least one function selected from;

1. Power fail light or emergency light activate by auto-off-on switch

2. Power output from built-in USB-port(s) to charge other product(s)

3. Flashlight illumination activate by auto-off-on switch 4. air flow function 5. color changing, color selection, color mixing, and other LED light effect(s).

Wherein, LED night light illuminate at least one of (1) different white color, (2) auto changing color(s), (3) select or freeze colors, (4) sequential flashing, (5) fade in and fade out colors.

Wherein air related part(s) offer at least one speed(s) of rotating blade(s) for different air flow amount.

22. The LED recess light has built-in air related part(s), comprising;

At least one LED(s) fit within recess light housing to offer illumination.

At least one air related part(s) fit within recess light housing to offer at least one air related function(s) select from;

(1) air flow with or without rotating front grill cover.

(2) air fragrance, or air fresher, or essential oil diffusor or smell.

Wherein, the LED recess light has desired electric part(s) to get DC power and control system to operate at least one of LED illumination and air related function(s).

23. The LED recess light has built-in air related part(s) as No. 22, the electric part(s) is one of (1) conductive wire, (2) quickly connect and male of lamp-base to assemble with female lamp-socket; to connect with AC power.

24. The LED recess light has built-in air related part(s) as No. 22, the

Electric part(s) is one assembly have (1) logic circuit to set functions to operate turn on-off recess light having air related part(s), (2) rechargeable battery (3) pre-program wall switch for electric circuit for plurality of recess lights,
(4) sensor(s) or detector(s);
to operate the at least one recess light having air related part(s) for at least one function(s); while electric loop of plurality of recess lights with or without air related parts is turn-off.

25 The LED recess light has built-in air related part(s) as No. 22, the LED(s) for recess light for illumination is one of (1) plurality of LED(s) or (2) LED bulb inside the recess light housing or separated own housing.

26. The LED recess light has built-in air related part(s) as No. 22, the Recess light has at least one sensor(s), detector(s), power fail circuit(s), IR or RF remote receiver, Blue tooth connecting system, WI-FI and download APP operation system, wireless controller system to operate the recess light(s) with or without built-in air related part(s) for preferred illumination and air related function, effects.

27. The LED recess light has built-in air related part(s) as No. 22, the Recess light has built-in air related part(s) is one of steady, rotating, detachable cover or grill cover or cover had plurality opening(s) with control system to make cover for steady or rotating for air flow or air fresher blow or spread direction(s).

28. The LED recess light has built-in air related part(s) as No. 22, the air related part(s) is one of steady or rotating grill(s) or slot(s) or opening(s) cover which is above or recess the surface of ceiling openings.

29. The LED recess light has built-in air related part(s) as No. 22, the air related part(s) has air inlet and outlet space to get enough air moving or circulation.

30. The LED recess light has built-in air related part(s) as No. 22, the air related part(s) offer air flow or air fragrance control by timer, wireless control system, IR or RF remote controller, blue tooth controller, Wi-Fi and download APP system, Z-way or Zig-Bee wire system; to make direction(s), rotating(s), speed of motor, air flow amount.

31. The LED recess light has built-in air related part(s) as No. 22, the quickly connector can assemble with different power source contact select from (a) male lamp-base, (b) conductive wire, (c) rechargeable battery, (d) DC power storage device for solar module, chemical reaction system, generator, wind power system to get desired power for illumination or air related function while electric loop is turn-off.

32. The LED recess light has built-in air related part(s) as No. 22, the recess light has built-in air related part(s) while the electric loop is turn-off; The said illumination and air related part(s) is control by at least one of (1) logic circuit, (2) pre-program electric loop wall switch; to turn on and turn off, or operate for pre-set timer or countdown timer for (i) illumination or (ii) air related part(s) or (iii) illumination and air related part(s).

33. The LED recess light has built-in air related part(s) as No. 22, the
Air related part(s) offer at least one of functions select from (i) air flow, (2) air fresher, (3) air fragrance, (4) de-odd smell, (5) essential oil diffusor, (6) liquid, moisture, steam sprayer; to desired direction(s) or area(s).

34. The LED recess light has built-in air related part(s) as No. 22, the LED(s) for recess light having air related part(s) install on at least one preferred location select from (a) fan blade, (b) air related part(s), housing, (c) grills or slots cover, (d) back housing of air related part(s), housing, (e) contour of the recess light; with one or more than one color(s).

35. The LED recess light for install on indoor ceiling, comprising;
LED illumination for recess light with or without the air related part(s) has more than one light illumination and function select from;
(1) different white color,
(2) auto changing color(s),
(3) select or freeze colors,
(4) sequential flashing,
(5) fade in and fade out colors.
(6) power fail light or emergency light while electric loop lost AC power
(7) Wake up light basing time setting system timer by wire or wireless.
(8) Sleep light basing pre-setting countdown timer by wire or wireless.
(9) having built-in logic-circuit on light source or electric loop circuit to control illumination for SOS, On-Off time, dust-to-dawn lighting, count down timers, turn on by photo sensor for a preferred time period.

36. The LED recess light has built-in air related part(s) as No. 35, the recess light has at least one color LED in chip or dice or LED bulb or CFL bulb for desired illumination.

37. The LED recess light has built-in air related part(s) as No. 35, the light source for recess light is one of wireless control LED or CFL bulb which having preferred setting, adjusting, selection device to operate light beam select for at least one (a) color(s), (b) brightness, (c) on-off timer, (d) sequential flashing, (e) fade-in and fade-out, (f) count down timer, (g) auto changing color(s), (h) select or freeze color(s), (i) Wi-Fi and download APP.

38. The LED recess light has built-in air related part(s) as No. 35, the light source for recess light is one of Wi-Fi LED or CFL bulb controlled by download APP software for at least one of (1) color, (2) brightness, (3) on-off time, (4) on-off timer, (5) other function.

The invention claimed is:
1. An LED night light having LED illumination and an airflow function, comprising;
at least one LED for providing LED light effects,
at least one airflow related part to supply people, objects, or space with the airflow function, wherein the at least one airflow related part has or is at least one of: (a) at least one fan blade, (b) a motor, (c) a gear set, (d) a circuit or controller, and (e) a switch; and
at least one of an AC-to-DC and a DC-to-DC circuit to supply operating DC power for the at least one LED, the motor, and the at least one airflow related part, while the LED night light is plugged into an AC outlet and the AC outlet has AC power,
wherein the at least one LED is incorporated with at least one of an IC, a wireless controller, and a control circuit, to create a variety of LED light effects,
wherein the LED night light (1) detects a power fail and (2) turns on a power fail light or emergency light, which is powered by a built-in rechargeable battery and controlled by at least one of (1) an auto-off-on selection switch, (2) at least one of an integrated circuit, power fail sensor and another circuit, and (3) a switch having more than one position.

2. An LED night light having LED illumination and an airflow function as claimed in claim 1, wherein the LED night light has a built-in foldable and/or rotatable prong.

3. An LED night light having LED illumination and an airflow function as claimed in claim 1, wherein the LED night light has a neck, shoulder, or body construction and at least one fixed or bendable arm to enable the LED night light to be worn by a person.

4. An LED night light having LED illumination and an airflow function as claimed in claim 1, wherein the at least one air related part offers at least one of: (a) air flow, and (b) a humidity, steam, or moisture sprayer.

5. An LED night light having LED illumination and an airflow function as claimed in claim 1, wherein the LED night light has motor or spin device to rotate at least one blade and create air flow with at least one of a setting, adjusting, and selection switch to get a desired amount of air flow.

6. An LED night light having LED illumination and an airflow function as claimed in claim 1, wherein the LED night light has control parts or accessories for setting, adjusting, or selecting at least one of: (a) at least one color or brightness of the at least one LED, (b) an on/off function, and (c) the airflow function or LED light effects, the control parts or accessories including at least one of:
   (1) an auto-off-on selection switch,
   (2) at least one switch to control the blade rotating speed,
   (3) a photo sensor,
   (4) a motion or radar sensor,
   (5) an IR or RF remote control or receiving unit,
   (6) a wired or wireless control system,
   (7) a WI-FI and downloaded APP system,
   (8) a Z-way or Zigbee wireless controller system, and
   (9) a Bluetooth connection system.

7. An LED night light having LED illumination and an airflow function as claimed in claim 1, wherein the LED night light further has a rechargeable battery and is configured to be applied in at least one of the following ways:
   (1) plugged into AC outlet for nighttime lighting or use as a nightlight,
   (2) fastened on a bar, pole, tube of a bicycle, or baby stroller by Velcro™ tape, a clip, or a fastening kit,
   (3) installed on the ground by a ground stake or pedestal set,
   (4) installed on a metal surface by at least one magnetic piece,
   (5) installed on a desktop, tabletop, flat surface, or computer desk,
   (6) worn by people on a neck or arms, or
   (7) charged by an AC outlet, cigarette plug, or external DC power source.

8. An LED night light having LED illumination and an airflow function as claimed in claim 1, wherein the LED light has at least one of following functions:
   (i) night time illumination while the LED night light is powered by AC or DC power,
   (ii) nightlight illumination while the LED night light is powered by AC or DC power,
   (iii) power fail or emergency lighting while the LED night light has lost AC power,
   (iv) use as a flashlight while the LED night light has lost AC power,
   (v) the at least one LED providing eye persistence light effects to show at least one of an image, patterns, message, or time related display,
   (vi) inputting power through at least one USB port, female receiving port, prong, or cigarette-plug and circuitry to charge an inner rechargeable battery,
   (vii) outputting power through at least one USB port to charge an external product,
   (viii) at least one USB port connected with an internal rechargeable battery acting as a power bank to charge another product that has lost AC power,
   (ix) the at least one airflow related part supplying airflow with different speeds to move air amounts,
   (x) the at least one air related part supplying air freshener or fragrance, or acting as an essential oil diffuser, moisture sprayer, or other diffusor or sprayer, and
   (xi) the at least one airflow related part supplying air flow while plugged into AC outlet, or while being carried by people and powered by a built-in rechargeable battery.

9. An LED night light having LED illumination and an airflow function as claimed in claim 1, wherein the LED night light has at least one electric component, part, or circuit selected from:
   (a) an IC, a control circuit, the AC-to-DC circuit, or the DC-to-DC circuit,
   (b) at least one motion, photo, or radar sensor,
   (c) at least one push-on-off, twist, rotating, contact, or conductive switch,
   (d) an IR or RF remote controller,
   (e) a wireless system that utilizes at least one of Wi-Fi, a Wi-Fi extension unit, downloaded APP software, Z-way, Zigbee, and Bluetooth,
   (f) at least one conductive piece, wire, or unit, and
   (g) other electric parts or accessories.

10. An LED night light having LED illumination and an airflow function as claimed in claim 1, further including an IC, or a wired or wireless control system, for setting, adjusting, or selecting at least one of
    (A) a color of the at least one LED, auto color change, select, or freeze functions, fade-in and fade out effects, or at least one other LED light sequencing or flashing function,
    (B) a brightness of the at least one LED, and
    (C) turn on-off, duration, cycles, on-time percentage and off-time percentage, speed for each on-off, and frequency of the at least one LED and/or the at least one air related part.

11. An LED night light having LED illumination and an airflow function as claimed in claim 1, wherein the LED night light has at least one of color changing, color selection, auto changing color, color freezing color, variable kelvin temperature white color light, and mixing color functions, controlled by at least one wired or wireless control system.

12. An LED night light having LED illumination and an airflow function, comprising:
    at least one LED for providing LED light effects,
    at least one airflow related part to supply people, objects, or space with the airflow function, wherein the at least one airflow related part has or is at least one of: (a) at least one fan blade, (b) a motor, (c) a gear set, (d) a circuit or controller, and (e) a switch; and
    at least one of an AC-to-DC and a DC-to-DC circuit to supply operating DC power for the at least one LED, the motor, and the at least one airflow related part, while the LED night light is plugged into an AC outlet and the AC outlet has AC power,
    wherein the LED night light has at least one bendable arm to change an orientation of the at least one air related part or the at least one LED, and thereby change a direction of at least one of an air flow provided by the air related part and the illumination provided by the at least one LED.

13. An LED night light having LED illumination and an airflow function, comprising:
   at least one LED for providing LED light effects,
   at least one airflow related part to supply people, objects, or space with the airflow function, wherein the at least one airflow related part has or is at least one of: (a) at least one fan blade, (b) a motor, (c) a gear set, (d) a circuit or controller, and (e) a switch; and
   at least one of an AC-to-DC and a DC-to-DC circuit to supply operating DC power for the at least one LED, the motor, and the at least one airflow related part, while the LED night light is plugged into an AC outlet and the AC outlet has AC power,
   wherein the LED night light has at least one USB port connected with one end of an external USB wire having a male USB plug to input or output DC power, wherein another end of the USB wire is connected with at least one of a:
   (1) computer,
   (2) communication device,
   (3) consumer product,
   (4) power bank,
   (5) DC storage device for a solar or chemical reaction device,
   (6) an AC-to-DC circuit,
   (7) an external transformer, and
   (8) a cigarette female socket.

14. An LED night light having LED illumination and an airflow function as claimed in claim 13, wherein the LED light is powered by AC power while the outlet has AC power.

15. An LED night light having LED illumination and an airflow function as claimed in claim 13, wherein the LED light is powered by a built-in rechargeable DC battery while the LED night light is without AC power or during a power failure at the AC outlet.

16. An LED night light having LED illumination and an airflow function as claimed in claim 13, wherein the LED light has at least one of the following illumination functions:
   (1) different white colors, or multiple colors,
   (2) auto changing of a color, sign, art, message, display, time, or clock,
   (3) selection or freezing of the color, sign, art, message, or display,
   (4) sequential flashing, or pre-programed on/off, duration time, frequency, and duty cycle,
   (5) fade in and fade out effects for the color, sign, art, message, or display,
   (6) power fail or emergency lighting while the night light or outlet has lost AC power,
   (7) a wake up light responsive to a time setting system timer set via a wired or wireless system,
   (8) a sleep light responsive to a countdown timer preset via the wired or wireless system.

17. An LED night light having LED illumination and an airflow function as claimed in claim 13, wherein a light beam is emitted from the at least one LED to show a fixed, changeable, or variable message, image or patterns, with art or geometric shape illumination effects, on at least one space or area traveled to or covered by at least one rotating fan blade.

18. An LED plug-in outlet night light having illumination and an airflow function, comprising;
   at least one of LED to offer at least one of a desired color, sign, art, messages, display, time, clock, and brightness, for illumination,
   at least one of air related part having at least one fan blade,
   wherein the LED plug-in outlet night light has at least one of a built-in AC-to-DC circuit and a DC-to-DC circuit to supply operating DC power for the at least one LED, an integrated circuit, and the at least one airflow related part,
   wherein the LED plug-in outlet night light has at least one of:
   (i) a charging kit to charge a built-in rechargeable battery, and
   (ii) at least one female receiving port to get power from an outside DC power source, transformer, or power pack,
   wherein the illumination is or has at least one of a:
   (1) different white color or multiple colors,
   (2) auto changing of a color, sign, art, message, display, time, or clock,
   (3) selection or freezing of the color, sign, art, message, display, time, or clock,
   (4) sequential flashing or preprogrammed on/off, duration time, frequency, and duty cycle, and
   (5) fade in and fade out thee color, sign, art, message, display, time, or clock, and wherein the at least one airflow related part offers at least one of:
      (A) multiple different speeds of the at least one fan blade for different air flow amounts,
      (B) a blade rotating speed faster than a human eye response time to enable at least one of a word, art, clock, time, and message to be shown by at least one LED built-in at least one blade, and
      (C) an angle change structure to change air flow direction.

19. An LED light having at least one LED to offer desired colors and brightness, and at least one airflow function, comprising:
   at least one prong to plug into an outlet to get AC power, which goes through at least one built-in AC-to-DC and/or DC-to-DC circuit to supply operating DC power for at least one LED and the at least one airflow related part; and
   a built-in rechargeable battery that is charged while the outlet has AC power outlet,
   wherein the at least one of air related part includes at least one fan blade,
   wherein, when the outlet loses AC power, the built-in rechargeable battery supplies power to at least one function selected from:
   (1) a power fail light or emergency light function activated by a power shut-down sensor and auto-off-on switch,
   (2) a power output function from at least one built-in USB port to charge at least one other product,
   (3) a flashlight illumination function activated by an auto-off-on switch,
   (4) an air flow function, and
   (5) color changing, color selection, color mixing, or another LED light effect, and wherein the illumination is or has at least one of a:
   (a) different white color,
   (b) auto changing color,
   (c) color selection or freezing,
   (d) sequential flashing, and
   (e) fade in and fade out colors, and
   wherein the at least one airflow related part offers multiple different speeds of the at least one fan blade for different airflow amounts, and has an angle change structure to change airflow direction.

* * * * *